United States Patent
Chilla et al.

(10) Patent No.: US 7,633,562 B2
(45) Date of Patent: *Dec. 15, 2009

(54) LASER ILLUMINATED PROJECTION DISPLAYS

(75) Inventors: Juan L. Chilla, Sunnyvale, CA (US); Sergei V. Govorkov, Boca Raton, FL (US); Andrea Caprara, Menlo Park, CA (US); Murray K. Reed, Menlo Park, CA (US); Luis A. Spinelli, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 12/012,966

(22) Filed: Feb. 6, 2008

(65) Prior Publication Data

US 2008/0143888 A1 Jun. 19, 2008

Related U.S. Application Data

(63) Continuation of application No. 11/011,075, filed on Dec. 14, 2004, now Pat. No. 7,355,657.

(51) Int. Cl.
*H01S 3/08* (2006.01)
(52) U.S. Cl. .................................... 348/756; 372/102
(58) Field of Classification Search ............... 348/744, 348/750, 756–761; 353/57; 372/102, 39, 372/43, 50, 92
See application file for complete search history.

(56) References Cited

U.S. PATENT DOCUMENTS 3,571,493 A 3/1971 Baker et al. ............... 178/5.2

(Continued)

FOREIGN PATENT DOCUMENTS

EP 0 589 179 A1 3/1994

(Continued)

OTHER PUBLICATIONS

I.V. Sedova et al., "Lasing in Cd(Zn)Se/ZnMgSSe Heterostructures Pumped by Nitrogen and InGaN/GaN Lasers," *Semiconductors*, vol. 38 (2004), No. 9, pp. 1099-1104 [translated from *Fizika i Tekhnika Poluprovodnikov*, vol. 38 (2004), No. 9, pp. 1135-1140.].

(Continued)

*Primary Examiner*—Paulos M Natnael
(74) *Attorney, Agent, or Firm*—Morrison & Foerster LLP

(57) ABSTRACT

A projection video display includes a light source including an OPS-laser delivering laser radiation in multiple transverse modes (a multiple-transverse-mode OPS-laser). The display includes a spatial light modulator for spatially modulating the radiation from the multiple-transverse-mode OPS-laser in accordance with a portion of an image to be displayed. Projection optics project the spatially modulated light on a screen on which the image is to be displayed. In one example the OPS-laser is a diode-laser array pumped OPS-laser and is one of three lasers, one delivering red light, one delivering blue light, and the other delivering green light. The lasers are time modulated such that the spatial light modulator receives light from each of the lasers separately. The OPS laser is directly time modulated by periodically turning the diode-laser array on and off.

22 Claims, 16 Drawing Sheets

U.S. PATENT DOCUMENTS

| | | | | |
|---|---|---|---|---|
| 3,818,129 | A | 6/1974 | Yamamoto | 178/7.3 D |
| 4,155,630 | A | 5/1979 | Ih | 350/188 |
| 4,720,747 | A | 1/1988 | Crowley | 358/231 |
| 5,131,002 | A | 7/1992 | Mooradian | 372/50 |
| 5,192,946 | A | 3/1993 | Thompson et al. | 340/794 |
| 5,272,473 | A | 12/1993 | Thompson et al. | 345/7 |
| 5,313,479 | A | 5/1994 | Florence | 372/26 |
| 5,317,348 | A | 5/1994 | Knize | 353/31 |
| 5,424,771 | A | 6/1995 | Yu | 348/203 |
| 5,648,649 | A | 7/1997 | Bridgelall et al. | 235/462 |
| 5,706,061 | A | 1/1998 | Marshall et al. | 348/743 |
| 5,740,190 | A | 4/1998 | Moulton | 372/23 |
| 5,774,487 | A | 6/1998 | Morgan | 372/45 |
| 5,844,716 | A | 12/1998 | Anderson | 359/462 |
| 5,894,489 | A | 4/1999 | Halldorsson et al. | 372/23 |
| 5,903,323 | A | 5/1999 | Ernstoff et al. | 348/771 |
| 5,990,983 | A | 11/1999 | Hargis et al. | 348/758 |
| 5,991,318 | A | 11/1999 | Caprara et al. | 372/22 |
| 6,018,408 | A | 1/2000 | Hong | 359/201 |
| 6,081,381 | A | 6/2000 | Shalapenok et al. | 359/619 |
| 6,088,102 | A | 7/2000 | Manhart | 356/354 |
| 6,088,380 | A * | 7/2000 | Lawandy | 372/102 |
| 6,092,900 | A * | 7/2000 | Diedrich et al. | 353/122 |
| 6,097,742 | A | 8/2000 | Caprara et al. | 372/22 |
| 6,137,631 | A | 10/2000 | Moulin | 359/618 |
| 6,154,259 | A | 11/2000 | Hargis et al. | 348/756 |
| 6,183,092 | B1 | 2/2001 | Troyer | 353/31 |
| 6,198,756 | B1 | 3/2001 | Caprara et al. | 372/22 |
| 6,233,025 | B1 | 5/2001 | Wallenstein | 348/750 |
| 6,285,702 | B1 | 9/2001 | Caprara et al. | 372/92 |
| 6,304,237 | B1 | 10/2001 | Karakawa | 345/84 |
| 6,318,863 | B1 * | 11/2001 | Tiao et al. | 353/31 |
| 6,353,502 | B1 | 3/2002 | Marchant et al. | 359/626 |
| 6,370,168 | B1 | 4/2002 | Spinelli | 372/22 |
| 6,393,038 | B1 | 5/2002 | Raymond et al. | 372/22 |
| 6,424,669 | B1 | 7/2002 | Jiang et al. | 372/50 |
| 6,426,836 | B2 | 7/2002 | Dorsel et al. | 359/443 |
| H2045 | H | 9/2002 | Busse et al. | 385/31 |
| 6,445,487 | B1 | 9/2002 | Roddy et al. | 359/278 |
| 6,483,556 | B1 | 11/2002 | Karakawa et al. | 348/750 |
| 6,552,754 | B1 | 4/2003 | Song et al. | 348/750 |
| 6,577,429 | B1 | 6/2003 | Kurtz et al. | 359/279 |
| 6,594,090 | B2 * | 7/2003 | Kruschwitz et al. | 359/707 |
| 6,600,590 | B2 | 7/2003 | Roddy et al. | 359/287 |
| 6,606,173 | B2 | 8/2003 | Kappel et al. | 359/15 |
| 6,614,827 | B1 | 9/2003 | Mooradian | 372/92 |
| 6,621,609 | B1 | 9/2003 | Conemac | 359/204 |
| 6,625,381 | B2 | 9/2003 | Roddy et al. | 385/147 |
| 6,764,183 | B2 | 7/2004 | Okazaki | 353/31 |
| 6,774,881 | B2 | 8/2004 | Karakawa | 345/84 |
| 6,795,455 | B2 | 9/2004 | Scheps | 372/21 |
| 6,798,804 | B2 | 9/2004 | Hayakawa | 372/43 |
| 6,801,299 | B2 | 10/2004 | Kremer et al. | 355/67 |
| 6,947,459 | B2 * | 9/2005 | Kurtz et al. | 372/43.01 |
| 6,950,454 | B2 * | 9/2005 | Kruschwitz et al. | 372/92 |
| 7,355,657 | B2 * | 4/2008 | Chilla et al. | 348/744 |
| 2002/0001328 | A1 | 1/2002 | Albrecht et al. | 372/50 |
| 2003/0011751 | A1 | 1/2003 | Sakata et al. | 353/30 |
| 2004/0036842 | A1 | 2/2004 | Tsai et al. | 353/31 |

FOREIGN PATENT DOCUMENTS

| | | |
|---|---|---|
| EP | 0 985 952 A1 | 3/2000 |
| EP | 1 359 752 A2 | 11/2003 |
| EP | 1 463 337 A2 | 3/2004 |
| EP | 1 411 732 A2 | 4/2004 |
| WO | WO 98/26328 | 6/1998 |
| WO | WO 98/35504 | 8/1998 |
| WO | WO 2004/064410 A1 | 7/2004 |

OTHER PUBLICATIONS

E. Schiehlen, "Optically-Pumped Surface-Emitting Lasers," *Annual Report 2000*, Optoelectronics Department, University of ULM (2000), pp. 59-64.

\* cited by examiner

LASER ILLUMINATED PROJECTION DISPLAYS

PRIORITY

This application is a continuation of U.S. application Ser. No. 11/011,075, filed Dec. 14, 2004, now U.S. Pat. No. 7,355, 657.

TECHNICAL FIELD OF THE INVENTION

The present invention relates in general to video displays, particularly projection TV displays, illuminated by laser radiation. The invention relates in particular to improving illumination efficiency and reducing manufacturing cost of such displays, and to reducing speckle effects in such displays.

DISCUSSION OF BACKGROUND ART

Several proposed arrangements of laser light illuminated projection displays have been described in many prior-art documents. It is believed, however, that, despite these prior-art descriptions there has not yet been produced a commercially available, consumer market, laser-illuminated video display of any kind.

In order for such a display to be acceptable in a consumer electronic market, such a display would need to be competitive in cost and technical performance with conventional projection displays that are illuminated with a white light source such as a mercury lamp. Requirements for a laser used in a laser projection display include, reliability, compactness, energy efficiency, closeness of the laser output wavelength to an additive primary (r, g, or b) wavelength, and a beam quality compatible with spatial light modulators used in the display. Perhaps equally important, the laser should be inexpensive and easy to manufacture in volumes that will be required in a consumer market. Further, the display must include measures to eliminate perceivable "speckle" and other effects in the display resulting from coherence of the laser radiation. These requirements are addressed in embodiments of an inventive laser display described hereinbelow.

SUMMARY OF THE INVENTION

In one aspect, the present invention is directed to a projection display comprising at least one OPS-laser delivering laser radiation in multiple transverse modes (a multiple-transverse-mode OPS-laser). The display includes a spatial light modulator for spatially modulating the radiation from the multiple-transverse-mode OPS-laser in accordance with a component of an image to be displayed. The display further includes projection optics for projecting the spatially modulated light on a screen on which the image is to be displayed.

In another aspect, the display includes first, second, and third lasers for generating and delivering respectively a red light beam, a green light beam and a blue light beam, at least one of said first, second, and third lasers being an optically pumped semiconductor laser. The display includes an optical arrangement for delivering the red, green and blue light beams to the spatial light modulator. The spatial light modulator is arranged to amplitude modulate the red, green and blue light beams in accordance with red, green, and blue components of an image to be displayed. A time modulation arrangement is provided for periodically interrupting delivery of the red, green, and blue light beams to the spatial light modulator in a manner such that the light beams are received separately by the spatial light modulator. The time modulation arrangement includes periodically interrupting the optical pumping of the optically pumped semiconductor laser, thereby periodically interrupting generation of the light beam provided thereby.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
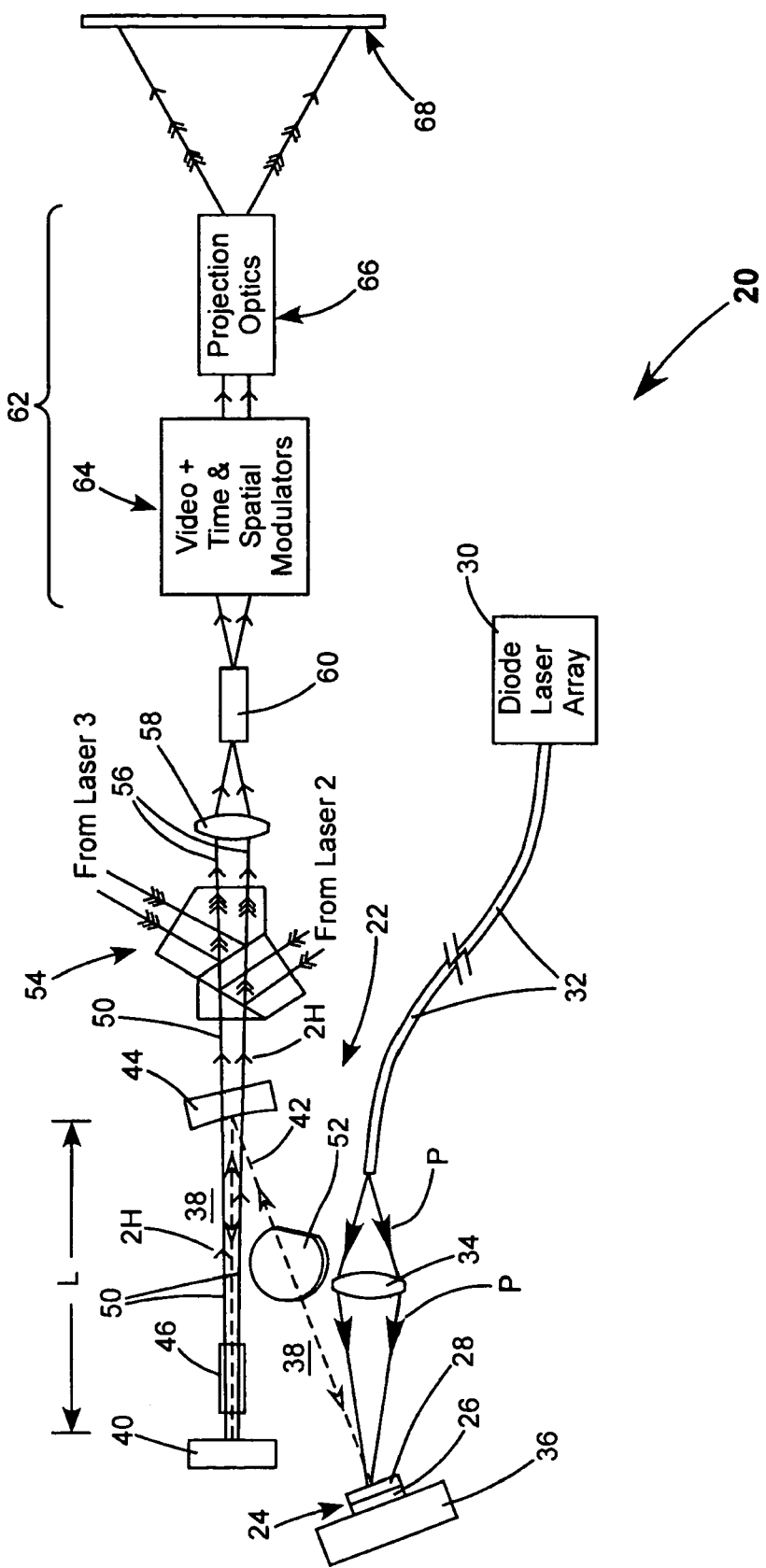
FIG. 1 is an elevation view, partially in functional block diagram form, schematically illustrating a first preferred embodiment of a laser-illuminated, rear projection television (RPTV) display in accordance with the present invention, including a two-arm folded resonator, frequency-doubled, optically pumped semiconductor laser pumped by a light from a diode-laser array and providing output radiation in multiple transverse modes, a video system including time and spatial modulators for second-harmonic radiation delivered by the laser resonator, and projection optics for projecting temporally and spatially modulated light onto a screen to provide the display.

A preferred laser for illuminating a display in accordance with the present invention is an optically pumped, external cavity, surface-emitting semiconductor laser, hereinafter referred to simply as an OPS-laser, includes a semiconductor chip (OPS-chip) comprising a mirror-structure surmounted by a gain-structure. A mirror, separate from the mirror structure, forms a resonant cavity including the gain-structure. The gain-structure is usually pumped by light from a diode-laser or plurality thereof. The gain-structure includes a plurality of active layers (quantum-well layers) spaced apart by pump-light-absorbing spacer layers. The resonator may be arranged to generate and deliver laser radiation at a fundamental wavelength, or at a harmonic wavelength of the gain-structure of the OPS-chip. The harmonic wavelength is generated by including one or more optically nonlinear crystals (harmonic generating crystals) in the resonator.

Examples of OPS-lasers can be found in U.S. Pat. Nos. 5,991,318; 6,097,742; 6,198,756 and 6,370,168 each of which are incorporated herein by reference.

One advantage of the OPS-laser over a solid-state laser for use in a video display is that the wavelength of laser radiation delivered, whether fundamental or harmonic, can be selected, essentially without limitation, by selecting an appropriate composition of material for the active layers of the gain-structure. Selecting appropriate wavelengths for red, green, and blue radiation for a display is important in providing faithful color reproduction.

Beam quality in a laser beam is usually characterized by a quantity $M^2$ which is a measure of beam divergence relative to a theoretical, diffraction-limited divergence ($M^2=1$). In a practical single-longitudinal-mode laser, an $M^2$ of about 1.1 is usually achieved. A problem of such a high-quality beam in a laser illuminated display however is that speckle effects would be exacerbated by a high degree of coherence in the beam, corresponding to the high beam quality. Accordingly, for use in displays in accordance with the present invention, an OPS-laser is developed with a resonator configuration that forces the resonator to deliver radiation in a plurality of transverse modes, thereby providing a lower quality, more divergent beam, that can contribute to reducing speckle effects in the display. Beam quality while relatively low by laser standards is certainly higher than that which would be obtainable from conventional white light sources used in prior-art commercial projection displays. Because the laser is only require to operate in multiple-transverse-modes rather than a single longitudinal mode, tolerances on components can be relaxed, and resonator alignment is less critical. This significantly reduces the cost of and simplifies the manufacture of the OPS-laser. These advantages are achieved in a compact efficient resonator, without sacrifice of output power, as disclosed in a detailed description of one example of such an inventive OPS-laser and the use thereof in a projection display presented hereinbelow.

Referring now to the drawings, wherein like components are designated by like reference numerals, FIG. 1 is a view, partially in functional block diagram form, schematically illustrating a first preferred embodiment 20 of a laser-illuminated, rear projection television display in accordance with the present invention. Laser 20 includes an OPS-laser 22. OPS-laser 22 includes an OPS-chip (OPS-structure) 24 including a mirror-structure 26 surmounted by a gain- structure 28. Gain-structure 24 is optically pumped by pump-light (designated by solid arrowheads P) from a diode-laser array 30. Pump-light from array 30 is delivered, here, via an optical-fiber bundle 32 and focused by a lens 34 onto gain-structure 28. This method is depicted, here, for convenience of illustration. Other methods of directing pump-light to the chip may be used without departing from the spirit and scope of the present invention. The focused pump-light beam has a diameter on the gain-structure that is referred to herein after as the pump-spot size or pump-spot diameter. OPS-chip 24 is bonded to a heat sink 36 that removes heat generated in the OPS-chip by absorbed pump-light that is not converted to laser radiation.

A laser resonator 38 is formed between mirror-structure 26 of the OPS-chip and a mirror 40. Resonator 38 has a longitudinal axis (designated by dashed line 42) that is folded by a mirror 44, here, a concave mirror. Optically pumping gain-structure 28 causes fundamental radiation to circulate generally along resonator axis 42, as indicated by open arrowheads F. The fundamental radiation has a wavelength dependent on the composition of the semiconductor material from which active layers of gain-structure 28 are formed. Mirror-structure 26, mirror 40, and mirror 44 are highly reflective, for example, greater than about 99% reflective, and preferably greater than 99.9% reflective for the fundamental wavelength. Mirror 40 is also highly reflective for a wavelength one-half that of the fundamental-wavelength, i.e., the second-harmonic or 2H-wavelength. Mirror 44 is highly transparent, for example, greater than about 95% transparent for the 2H-wavelength.

An optically nonlinear crystal 46 is located in an arm of resonator 38 between fold mirror 44 and resonator end-mirror 40. Optically nonlinear crystal 46 is arranged to frequency-double the circulating radiation and thereby generate frequency-doubled (second-harmonic or 2H) radiation having a wavelength one-half that of the fundamental radiation. The 2H-radiation is generated on both forward and reverse passes of the fundamental radiation through the optically nonlinear crystal. The 2H-beam exits the resonator via mirror 44 as a divergent beam of output radiation. Extreme rays of the 2H-radiation beam are designated by lines 50 and open arrowheads 2H. Resonator 38 is configured such that the fundamental beam size in optically nonlinear crystal 46 is focused to a small waist to maximize the intensity of the fundamental radiation and thereby maximize, all else being equal, the 2H-conversion efficiency.

A wavelength selective element 52, here, a birefringent filter, is located in a second arm of the folded resonator between OPS-chip 24 and fold mirror 44. This element is used to select a fundamental wavelength from the gain bandwidth of gain-structure 28 of the OPS chip. An etalon could be used in place of the birefringent filter. It is recommended, however, that the bandwidth of the wavelength selective element be only sufficiently narrow that wavelengths outside the acceptance bandwidth of optically nonlinear crystal 46 be prevented from oscillating in resonator 38. If the bandwidth is made any narrower, the bandwidth 2H-radiation output by the laser will be correspondingly narrowed. This may exacerbate speckle effects in the display. The coherence length of a laser beam is inversely proportional to the spectral bandwidth of the beam. Accordingly, the wider the spectral bandwidth, the shorter the coherence length of the light, and the less the possibility of speckle effects on a projected beam of the light.

The size of the circulating fundamental beam is not indicated in FIG. 1 for simplicity of illustration. Important dimensions of the fundamental beam are the diameter of the beam at gain-structure and the diameter of the beam at optically nonlinear crystal. A discussion of these dimensions is set forth below with reference to resonator configuration, and to a desired mode mode-structure of the 2H output beam.

In prior-art OPS resonators it is customary to configure a resonator such that the size of the fundamental ($TEM_{00}$) mode at the OPS-chip is about the same size as, or even slightly larger than, the pump-spot. This is consistent with current practice in solid-state lasers wherein $TEM_{00}$ mode size and the pump-spot size are matched at the solid-state gain medium for optimum gain extraction. In an OPS laser, however, because of the periodic nature of gain distribution in the gain-structure of the chip, the first mode to oscillate commands all of the available gain, thereby preventing any other mode from oscillating. In a resonator that does not permit oscillation of transverse modes, the oscillating mode, accordingly, is one single longitudinal mode, spontaneously self-selected from a range of longitudinal modes of slightly different wavelengths that could theoretically oscillate, dependent, inter alia, on the length of the resonator. It is this ease of (essentially inherent) single-mode operation, that has caused an OPS-laser to be considered by practitioners of the art as a convenient laser for providing a high quality, single-longitudinal-mode beam. Such a beam, however, is undesirable in a projection display, and such a laser is relatively difficult and expensive to manufacture.

In OPS laser 22, resonator 38 is configured such that the $TEM_{00}$ mode size at OPS-chip 24 is significantly smaller than the pump-spot size. This is accomplished in a way that allows other transverse modes to make use of gain available in that part of the pumped gain-structure 28 surrounding the $TEM_{00}$ mode and oscillate in the resonator. The resonator, accordingly, oscillates such that 2H-output beam 50 includes a plurality of transverse modes, regardless of the inherent longitudinal mode selection of the OPS-resonator. Different transverse modes oscillate and propagate at angle to each other, which, as discussed in detail further hereinbelow, can be advantageous in reducing speckle effects.

In an OPS laser 22, the degree of transverse mode operation can be varied by varying the spacing L between mirrors 40 and 44, while keeping the spacing between OPS chip 24 and mirror 44 constant. A detailed description of theoretical and experimental results of such variation is set forth below with reference to FIG. 2, FIG. 3, and FIG. 4.

Figure 2:
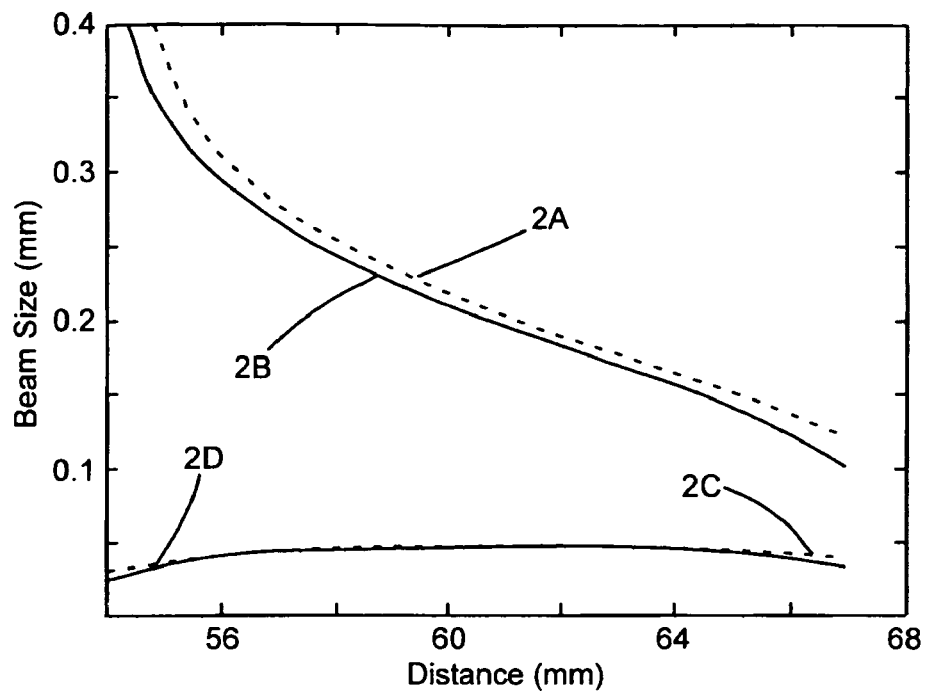
FIG. 2 is a graph schematically illustrating computed spot size of the $TEM_{00}$ mode at two different positions in the laser resonator of FIG. 1 as a function of length of one arm of the resonator.

FIG. 2 is a graph schematically illustrating the variation in the computed spot-size of the $TEM_{00}$ mode at OPS chip 24, and at optically nonlinear crystal 46 in one example of a resonator 38, as a function of varying distance L of mirror 40 from mirror 44. Sizes are shown for the transverse X-axis of the resonator (curve 2B), parallel to the plane of the drawing, and the transverse Y-axis perpendicular thereto (curve 2A). In this resonator, mirror 40 is a plane mirror and mirror 44 is a concave mirror having a radius of curvature (ROC) of about 100.0 millimeters (mm). The distance from OPS-chip to mirror 44 is about 200.0 mm. The distance L between mirrors 40 and 44 was made variable between about 52.0 and 60.0 mm. Accordingly, the total optical length of the resonator (axial optical distance from mirror structure 26 to mirror 40) is between about 252.0 and 260.0 mm. The physical length of the resonator, is about 200.0 mm. The included fold angle of the resonator is about 10°. This example of resonator 38 should operate in a single longitudinal ($TEM_{00}$) mode when L is about 57.0 mm or less. Gain-structure 28 of the OPS-structure includes active of layers of indium gallium arsenide (InGaAs).

The gain-structure is pumped by up to about 60.0 W of diode-laser light having a wavelength of about 800 nm. The diode-laser pump light in this experiment is supplied by two diode-laser array packages via two optical fibers. The pump-spot size on gain-structure 28 is about 300 microns radius. The fundamental wavelength is about 920 nanometers (nm), providing 2H-output radiation at a wavelength of about (460) nm. This approximates a preferred blue wavelength in an rgb display. Heat sink 36 is an air-cooled, copper heat sink, and OPS-chip 24 is soldered to the heat sink via a diamond heat-spreader layer.

The computed $TEM_{00}$ beam size at the OPS-chip, when L is equal to about 57.0 mm is about 0.27 mm. As L increases, the $TEM_{00}$ beam size progressively decreases until at L equal to about 66 mm, the $TEM_{00}$ beam size is about 0.13 mm. The size as a function of L is not significantly different in either transverse axis (see curves 2C and 2D for the Y and X-axes respectively). Over the same range of L, the beam size at optically nonlinear crystal 46 is substantially constant, and about equal, in both transverse axes, at a size of about 0.05 mm.

Figure 3:
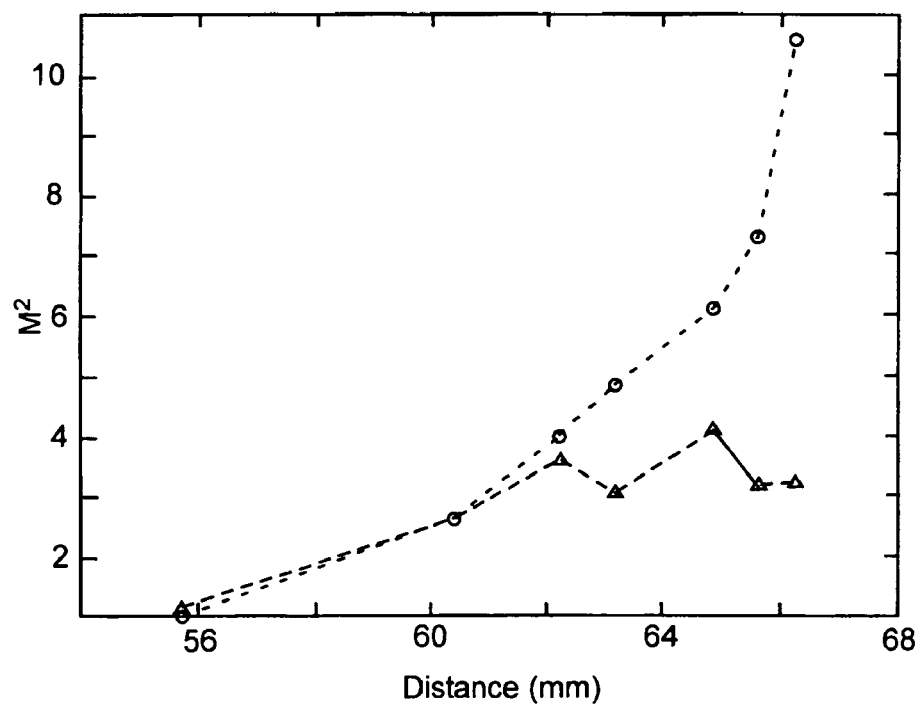
FIG. 3 is a graph schematically illustrating measured divergence of a frequency-doubled output beam in one example of the laser resonator of FIG. 1, in two mutually perpendicular axes as a function of length of one arm of the resonator.

FIG. 3 is a graph schematically illustrating measured divergence $M^2$ of 2H-output beam 50 in the above described example of OPS laser 22, in the transverse X an Y-axes of resonator 38, as a function of length of one arm of the resonator. Y-axis measurements are designated by circles, and X-axis measurements are designated by triangles. As L is increased, the measured $M^2$ in the Y-axis increases with a progressively increasing slope. In the X-axis, the measured $M^2$ increases similarly up to a value of about 4, at which $M^2$ remains essentially clamped. This is presumed to be because at greater values of $M^2$, the divergence is greater than the phase-matching acceptance angle of optically nonlinear crystal 46. A test measurement indicated that the 2H-output beam was still about symmetrical in cross-section at $M^2=6$.

Figure 4:
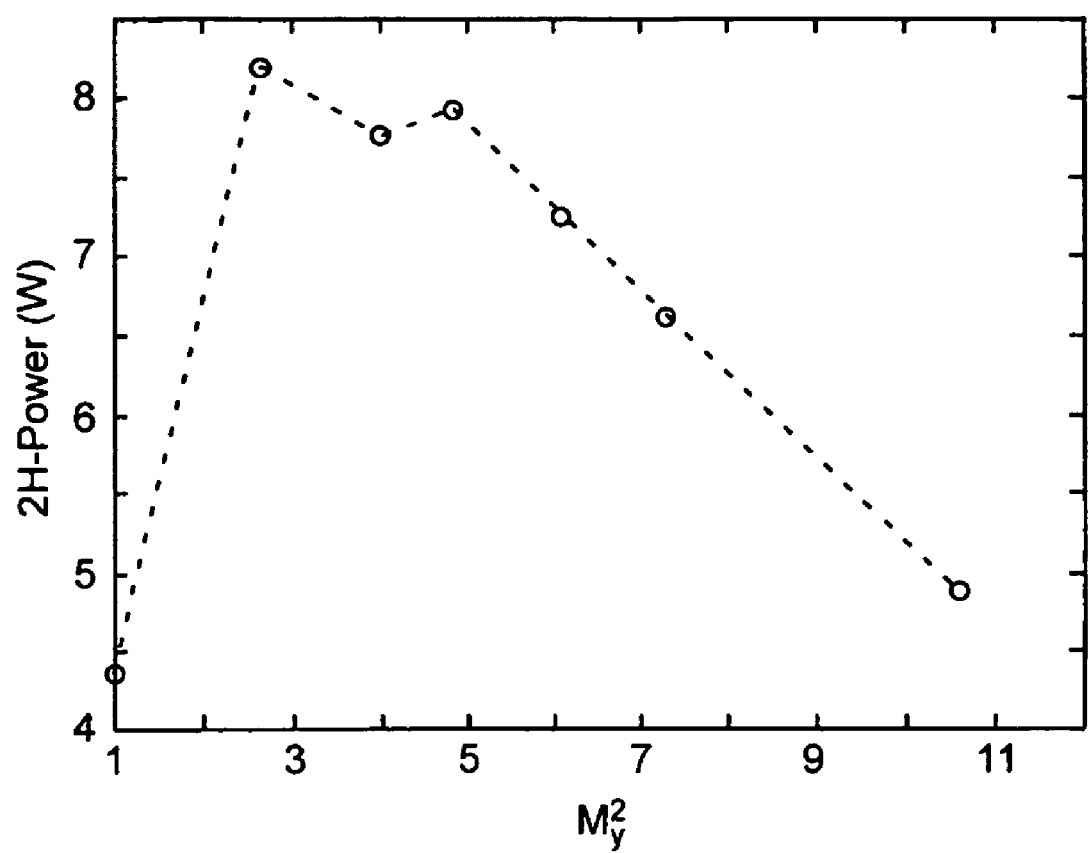
FIG. 4 is a graph schematically illustrating total second-harmonic output power as a function of beam divergence in the resonator example of FIG. 3.

FIG. 4 is a graph schematically illustrating measured total power (of all modes) in 2H-output beam 50 as a function of $M^2$, here, Y-axis beam divergence $M^2_y$, in the above-discussed example of resonator 38. As $M^2$ increases from the single-longitudinal-mode-only condition ($M^2 \approx 1.0$), output power increases rapidly from an initial value of about 4.4 W, and, at an $M^2$ slightly greater than about 2.0, is about 8.25 W, i.e., about twice the single-longitudinal-mode power. At $M^2$=about 6, at a level greater than which the 2H-output beam, in this example at least, becomes asymmetrical, output power is still well above the single-longitudinal-mode-only value. At $M^2=11$, 2H-output power is still higher than the single-longitudinal-mode-only value. At this $M^2$ value, however, the 2H-output beam is likely to be highly asymmetrical. Beam asymmetry in this application is not a particular disadvantage and could be an advantage in illuminating a one-dimensional spatial light modulator. Accordingly, a useful $M^2$ range for the inventive OPS laser is between about 2 and 20.

The OPS-laser used for the above-described experiments to determine a useful range of $M^2$ for a multiple-transverse-mode laser in accordance with the present invention has a disadvantage that the overall optical length of the resonator at about 260.00 mm and indeed the physical "footprint" of the resonator at about 200.0 mm is longer than would be convenient in a practical commercial projection display. Accordingly, a different resonator was designed, consistent with the arrangement of resonator 38, but that is more compact and that will only operate in multiple transverse modes, and more specifically could not be rearranged to operate in a single mode.

In this example of resonator 38, mirror 44 has an ROC of about 75.0 mm and mirror 40 is a plane mirror. Distance L between mirrors 44 and 40 is about 43.0 mm. The distance between OPS chip 24 and mirror 44 is about 60.0 mm. The resonator fold angle is about 30°. The resonator delivers peak CW 2H-power of about 6.0 W for a pump power of about 50.0 Watts, at an $M^2$ between about 2 and 3. Here, the resonator output power is comparable, at comparable $M^2$, to the first-discussed resonator example used in the above-described experiments, while the physical length of the resonator, at about 60.0 mm, is less than one-third the length of that first discussed resonator example.

It should be noted that in this compact version of the multiple-transverse mode OPS resonator, pump-light is provided by a diode-laser bar (linear array of diode-lasers) and focused directly from the diode laser bar onto OPS chip 24. The fast axis of the diode-laser bar is aligned in the X axis of the resonator. Focusing is accomplished by a total of four lens elements, with two of the elements being used to collimate light from the diode laser bar, and the other two elements being used to focus the collimated light. The focused spot is somewhat rectangular in shape. This provides an increase in pump-light to output efficiency (compared with fiber delivered pumping) ranging from about 100% at a relatively low output power of about 1.5 W to about 30% at an output power of about 4.5 W.

It is believed that, for this particular resonator configuration at least, even greater efficiencies can be achieved if the light from the diode-laser bar is focused to a pump spot having an elliptical shape, and a power density of about twenty kilowatts per square centimeter (20 KW/cm²) on the OPS-chip. This may require the use of aspheric lenses. However, the manufacturing and design technology for such lenses is well within the capabilities of commercial concerns that specialize in optical design and manufacture.

It should be noted that a further advantage of such pumping directly from a diode-laser bar is that considerably less space is required for pump-light-delivering apparatus than would be required for one or more commercial diode-laser array packages from which light is delivered via an optical fiber bundle. This space-saving aspect of direct pumping is consistent with the quest for compactness without sacrifice of power in a laser for projection display applications.

It should further be noted that while the multiple-transverse-mode lasers in accordance with the present invention are described above in terms of a frequency-doubled laser, such laser being designed for and used in a projection display, red, green or blue light may also be provided by the fundamental wavelength of a multiple-transverse-mode OPS-laser. Green light may be generated from an OPS-laser chip including active layers of a II-VI semiconductor, such a zinc sulfo selenide (ZnSSe). Blue light may be generated from an OPS-laser chip including active layers of an indium gallium nitride (InGaN). At the present state of development of these materials however, it may not be possible to generate the desired one Watt or more of power from a diode-pumped OPS-laser using these materials.

Continuing now with reference again to FIG. 1, laser 22 of display 20 includes two other lasers (not explicitly) shown, that provide the two rgb colors not provided by laser 22. These two lasers are preferably multiple transverse OPS-lasers as described above. Output beams from laser 22 and from lasers 2 and 3 are combined in an optical color combining arrangement, here, a well-known Philips prism arrangement 54. Beam contributions from lasers 2 and 3 are designated by double and triple open arrowheads, respectively.

The combined laser beams are focused by a lens 58 into a beam homogenizer 60. Homogenizer 60 may be any type of diffuser including a light pipe, an optical fiber and a diffuser. A light pipe, however, is preferred for use with the inventive multiple-transverse-mode OPS-laser. While homogenizing combined beams in a single homogenizer is preferred, each laser beam may be individually homogenized without departing from the spirit and scope of the present invention.

In addition to the inventive multiple-transverse-mode OPS-laser 22, display 20 includes usual arrangements 62 for converting light from three lasers into a projected image of a display. The arrangements include video electronics for receiving broadcast or media-recorded video image information; a spatial modulation (spatial amplitude modulation) arrangement for applying light-intensity values to the illuminating laser beams according to the received video information, and an arrangement for time modulation of the laser beams for sequencing beams of the different primary colors into the spatial modulation arrangement. These arrangements are designated in FIG. 1 as being included in a single unit 64 for convenience of illustration. The arrangements, however, may be in separate units, and the functions provided need not be located in, or performed in, the sequence designated in FIG. 1.

By way of example, in one conventional display designed for (non-laser) white light illumination, a so called color-wheel including a peripheral array of color filters is arranged to sequentially transmit the three additive primary colors (rgb) and interposed between the spatial light modulator and the illumination source. This functions as a chopper-wheel type of time modulator that, in effect, sequentially turns the illuminating beam (from the point of view of the spatial modulator) on and off, with the color changing to one of the primary colors at each "on" period. Each primary color is modulated separately by the spatial modulator to correspond to the spatial content of that color in the projected image on screen 68. The modulation rate is sufficiently rapid that, to an observer, all three colors appear to be present simultaneously in the display. In the laser of FIG. 1, where individual CW beams of red green and blue light are provided, these beams may be sequenced on and off individually by some other time modulation arrangement such as a simple chopper wheel, an acousto-optic (AO) modulator, or an electro-optic (E-O) modulator.

It is emphasized, here, that image providing arrangements depicted in FIG. 1 are not intended to represent any particular one such arrangement. The arrangements will depend in particular on the type of spatial modulator or modulators employed, and whether these are one or two-dimensional modulators. One-dimensional spatial modulators (spatial light modulators) will require a scanning arrangement to provide a second dimension to the projected image. Spatial modulators may include, among others, a digital light processor such as a DLP™ produced by Texas Instruments of Dallas Tex., a grating light valve such as a GLV™ produced by Silicon Light Machines of Sunnyvale, Calif., a grating electromechanical system such as a GEMS™ produced by Eastman Kodak of Rochester, N.Y., or a liquid crystal based modulator such as LCOS™ (liquid crystal on silicon) produced by Intel Corporation of Santa Clara, Calif. As the operation of these modulators and arrangements for projecting an image using each of these modulators has been described in detail in prior-art documents, a detailed description of any such operation or arrangement is not provided here.

Figure 5:
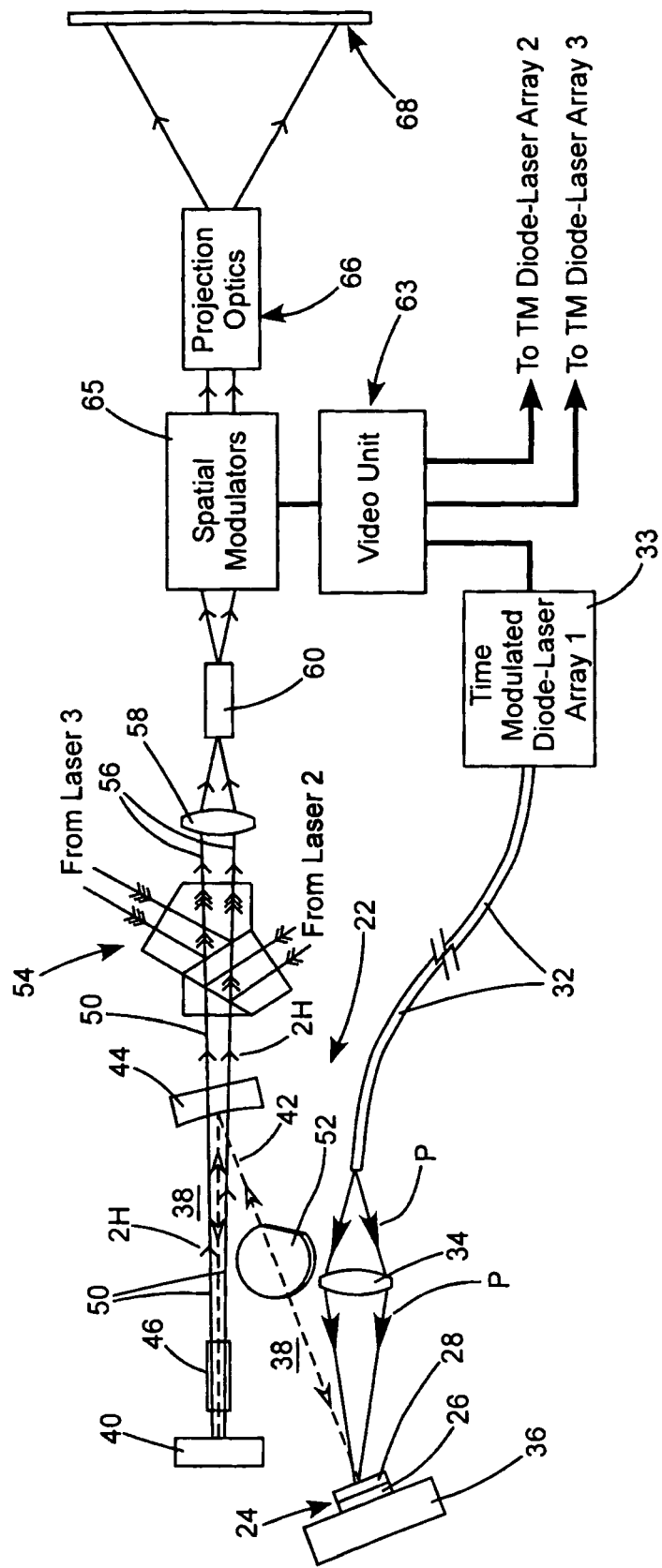
FIG. 5 is an elevation view, partially in functional block diagram form, schematically illustrating a second preferred embodiment of a laser-illuminated, rear projection television display in accordance with the present invention, similar to the display of FIG. 1, but wherein time modulation of the second harmonic output radiation of the laser resonator is provided by modulating the pump-light output of the diode-laser array under control of the video system.

FIG. 5 schematically illustrates a second preferred embodiment 70 of a laser-illuminated, rear projection television display in accordance with the present invention. Display 70 is similar to display 20 of FIG. 1, with an exception that time modulation of light illuminating the display is effected by directly modulating the operation of multiple-transverse-mode laser 22 rather than modulating CW radiation delivered by the laser after the radiation has been delivered. In display 70, multiple-transverse-mode laser 22 is pumped by a modulated diode-laser array 33. A video unit 63 provides signals controlling modulation of the diode-laser array, the term "modulation" in this instance meaning turning the diode-laser array on and off, i.e., alternately delivering and not delivering pump-light. Laser 22, correspondingly, intermittently delivers radiation, in effect, as a sequence of radiation pulses, corresponding to the modulation of diode-laser array 33.

In time modulation of a CW (unmodulated) beam delivered by a laser, radiation in the "off" periods for the radiation is directed away from the spatial modulators and projection optics of the display and must be absorbed or baffled in such a way that the quality of the projected display is not adversely affected. In the above described direct modulation scheme, laser 22 only delivers radiation that will be spatially modulated for projection. This is advantageous in minimizing the need for absorbing or baffling "unprojected" radiation and is also advantageous in saving power consumed in generating radiation that does not form part of a displayed image. Further, when an OPS-structure is directly modulated, pump-light is only delivered to the OPS-structure when radiation is required. This reduces heat deposited in the structure compared to CW delivery of pump-light and external modulation. This advantage can be exploited to provide higher pulse power on a given heat sink, or to reduce heat sink requirements for the same pulse power.

Figure 5A:
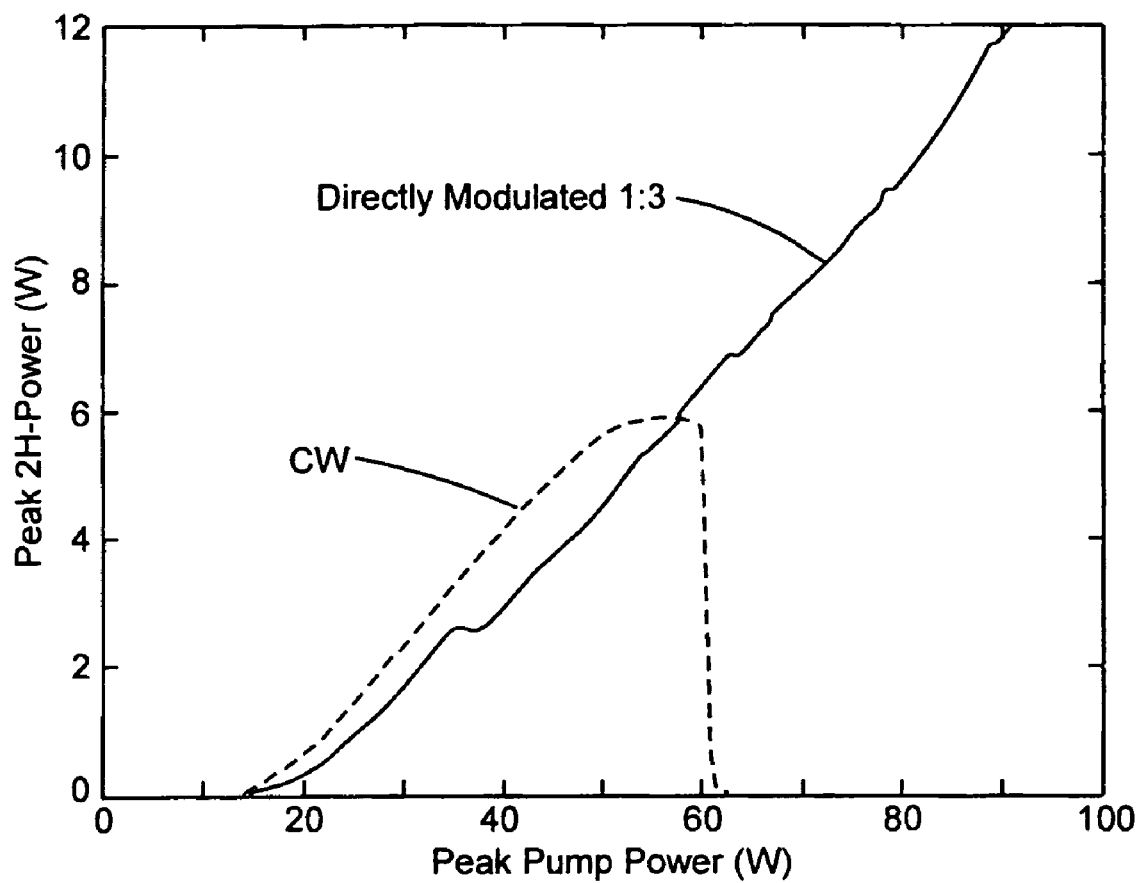
FIG. 5A is a graph schematically illustrating peak frequency-doubled output power as a function of peak pump-light power for a multiple-transverse-mode OPS-laser in accordance with the present invention in CW operation and in directly modulated operation.

By way of example FIG. 5A schematically illustrates peak 2H-output power as a function of peak pump-light power in multiple-transverse-mode OPS-laser in accordance with the present invention, for CW operation (dashed curve), and for pulsed (modulated) operation (solid curve). In the pulsed operation, radiation is delivered for one millisecond (ms) with a two milliseconds "off" time between deliveries, i.e., in a duty cycle of 1:3. It can be seen that in CW operation, output power increases with increasing pump power before falling catastrophically as the OPS-chip reaches the exceeds a maximum-possible operating temperature. In pulsed (directly modulated) operation, power increases essentially linearly with pump power, at least for the range of power available for the experiment.

CW performance could possibly be improved by improved-heat sinking, however, any such improvement would also be obtained in directly modulated operation. A detailed description of heat sinking techniques is not necessary for understanding principles of the present invention and is not presented herein. In experiments described above, OPS-chips were bonded to commercially-available heat sinks. These are believed to be constantly under development by manufacturers of same, and multiple transverse mode OPS-lasers in accordance with the present may benefit, one way or another, from any improvements that result.

Continuing with a discussion of advantages of direct modulation of a multiple-transverse-mode OPS laser, in a display including a one-dimensional spatial modulator and scanning projection optics, modulation rates may be as high one megahertz (MHz), dependent, inter alia, on the number of scan lines in a frame of the image and the frame refresh rate. A determining factor in how rapidly a laser can be directly modulated by modulating pump-light delivered to the gain-medium of the laser is a so called "relaxation time" characteristic of the gain-medium. The relaxation time is the time required for gain generated by a pump-light pulse to decay after the pulse is terminated. In an OPS gain-structure, the relaxation time is less than 1.0 microsecond ($\mu$s) and can be as little as one-hundred nanoseconds (ns).

A diode-laser array for providing pump-light can be modulated at rates as high as a few MHz, this allows the inventive directly modulated OPS-laser to be directly modulated at a rate of at least 1 MHz and possibly as high as a few MHz. In a solid-state gain-medium such as neodymium-doped YAG (Nd:YAG) or neodymium-doped yttrium vanadate (Nd:YVO$_4$) the relaxation time is on the order of one-hundred microseconds (μs). This limits direct modulation of such a gain-medium to a maximum of about 100 kilohertz (KHz), whether or not the gain-medium is pumped by a diode-laser array.

In an experiment to test the efficacy of the inventive multiple-transverse-mode OPS-laser in reducing speckle effects in a laser-illuminated projection video display, an experiment was conducted in which green and blue multiple-transverse-mode OPS-lasers configured in accordance with the configuration of laser 22 of FIG. 1, and a diode-laser bar providing red light were used to illuminate a commercially available projection display that was originally designed to be illuminated by incoherent "white" light from a mercury lamp.

The lasers used in the experiment were CW lasers. i.e., not directly modulated. The original mercury-lamp illuminated display was manufactured by Samsung Corporation. Such a display, being configured for illumination by incoherent light, does not include any device or measures expressly for reducing speckle effects of coherent light. The mercury lamp of the laser was removed and the combined output of the multiple-transverse-mode OPS-lasers substituted as a source of white light for illuminating the display. Output beams from the lasers are combined by a dichroic combiner and focused into a beam homogenizer as depicted in display 20 of FIG. 1. The homogenized beam was relayed into another beam homogenizer (not shown) already provided in the display.

While speckle contrast viewable in a projected image could be judged as possibly somewhat less than what might be expected in a display illuminated by single-longitudinal mode lasers of limited spectral bandwidth, speckle effects were still readily perceivable. The terminology "readily perceivable" as used here means that an observer invited to view the display, without specifically being directed to examine the display for speckle effects, would be conscious of these effects and may be distracted by the effects unless the subject matter of the display were sufficient to completely capture the observer's interest.

One effect that was noticeable, in addition to speckle contrast, was that, in a blank-white screen-image, there are readily perceivable colored "rainbow" effects. It is believed that these effects result from diffraction of the illuminating light at any particle or scratch in or on an optical component in the chain of projection optics. The effect appears as a series of rainbow colored lines and circles. Speckle patterns are different for each projected color and produce a finely dispersed rainbow effect all over an otherwise blank white display.

Figures 6, 6A:
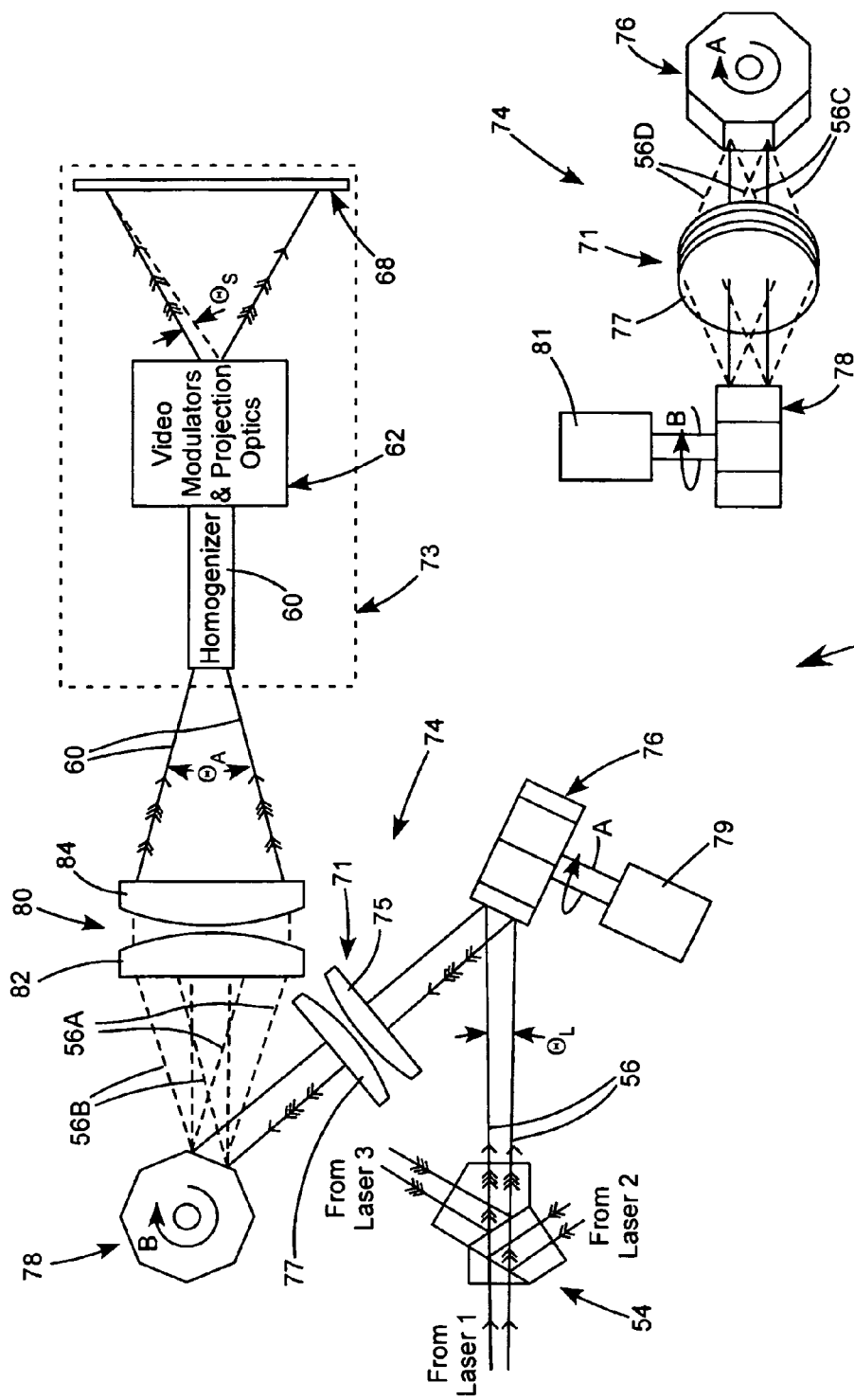
FIG. 6 is an elevation view, partially in functional block diagram form, schematically illustrating a display similar to the display of FIG. 1, but further including a two-axis scanning arrangement including two rotating, multi-faceted scanner wheels having a lens therebetween, the arrangement for providing an apparently high divergence in a combined laser beam delivered to the video system.
FIG. 6A is a plan view from above, schematically illustrating further details of the scanner wheels and lens of the scanning arrangement of FIG. 6.

The rainbow effects were eliminated in a modification of the experimental display schematically depicted in FIG. 6 and FIG. 6A. Here an apparatus 72 includes elements of the above-discussed commercial projection TV (less the originally-provided mercury lamp) grouped as designated by dotted line 73.

The red, green, and blue lasers used for illuminating the TV are not explicitly depicted in FIG. 6 but are designated simply as lasers 1, 2, and 3. Beams from these lasers are combined in Philips prism 54 to provide a combined beam 56 having a divergence $\Theta_L$. Beam 56 is directed to a two-dimensional scanner arrangement 74 comprising first and second faceted scanner wheels 76 and 78, rotatable about mutually perpendicular axes as indicated by arrows A and B. The scanner wheels are rotated by precision stepper motors 79 and 81 (FIG. 6A). When scanner wheels 76 and 78 are rotated, beams comprising beam 56 are scanned through a range of angles in planes parallel and perpendicular to the plane of the drawing. The beams are scanned over a condenser lens 71 including plano-convex lens elements 75 and 77. Condenser lens 71 focuses beam-scans in a plane perpendicular to the plane of FIG. 6 back to a single spot on a facet scanner wheel 78 (see FIG. 6A). After reflection from that facet, of course, the beam scans will again fan out in the plane perpendicular to the drawing of FIG. 6 while being scanned in the plane of that drawing. Extreme positions of the scanned beam-fans in the plane of FIG. 6 are indicated by dotted lines 56A and 56B. Extreme positions of the scanned beam in the plane of FIG. 6A (perpendicular to the plane of FIG. 6) are indicated by dotted lines 56C and 56D.

Scanning of beam 56 by the scanner wheels was arranged such that the beam was scanned in a raster fashion over lens 80, with scanning by one facet of scanner wheel 78 being completed at about the frame rate of the display 73, while scanning by one facet of scanner wheel 76 was completed at about the line rate of the display. Use of faceted scanning wheels permits a high scanning rate, with a required rotation rate of each scanner wheel being a fraction of the scanning (line or frame) rate inversely dependent on the number of facets on that wheel. This permitted that a motor driving a scanner wheel, for example, motor 79 driving scanner wheel 76, as noted above, could be a precision stepper motor. The rotation rate of such motors can be accurately controlled. Beam 56 was scanned through an entire raster pattern at the frame rate of the display, i.e., in less than about 50.0 ms, which is less than the response time of the human eye.

The scanned combined laser beams were focused by a condenser lens 80 (including plano-convex lens elements 82 and 84) into homogenizer 60 of display 73. The effect of the scanning is that the combined beams, averaged over time, appear to an observer to fill a cone or solid angle bounded by an angle $\Theta_A$, which is the acceptance angle of the display, and is greater than the laser beam divergence $\Theta_L$. A result of the scanning was that speckle effects, while not entirely eliminated, were no longer readily perceivable by a casual observer. The rainbow effects observed without the scanning arrangement were completely eliminated.

Continuing with reference to FIG. 6, it is useful at this point to briefly review the principle of increasing beam divergence to reduce coherence related effects of a beam such as the above-discussed speckle (interference) and rainbow (diffraction) effects. The maximum angle of the light cone $\Theta_A$ of condenser lens is limited by the acceptance angle of the particular spatial light modulator used in the display. In addition, dimensions of the light modulator and of the screen determine the maximum angle $\Theta_S$ subtended by the projection optics on screen 86. Angle $\Theta_S$, accordingly, is proportional to angle $\Theta_A$ and determines the spatial coherence properties of light incident on the screen. Specifically, the coherence radius $r_c$ at the screen is approximately equal to $\lambda/\Theta_S$, where $\lambda$ is the wavelength of the monochromatic light. By way of example, in the display used in the experiment, the spatial light modulator is a DLP™ modulator having a diagonal of about 0.8 inches. Screen 68 has a diagonal of about 52 inches. Optics illuminating the modulator can have an f:number of about 2.4. This means that $\Theta_S$ is about equal to 2*ArcTan(1/(2*f:number), which is about equal to 23.5 degrees. The angle $\Theta_S$ subtended by the projection optics at the screen is about equal to $\Theta_A$*0.8/52, which is equal to 0.36 degrees. This leads to a coherence radius $r_c$ of about 80.0 μm for a wavelength $\lambda$ of 0.5 μm.

The contrast of speckle observed by a standard observer is proportional to the ratio of the coherence radius $r_c$ to the size of the point spread function of the observer's eye at the screen. One way to reduce speckle contrast is to reduce the spatial coherence radius $r_c$ of the incident light by actually increasing, or effectively increasing, its angular spread, ultimately, to match the acceptance angle of the projection optics.

Lasers generate highly spatially coherent beams. High spatial coherence, here, means that the radius of spatial coherence is on the order of the beam diameter. The coherence radius is in inverse proportion to the divergence angle. The divergence angle of a single-mode laser beam is nearly diffraction limited. The diffraction limited divergence angle is far below the acceptance angle $\Theta A$ of a typical projection TV as discussed above. Increasing the apparent divergence angle of a laser beam substantially above the original divergence angle thereof by the above-discussed scanning arrangement reduces coherence radius of the beam at the screen compared with the original coherence radius of the beam, thereby contributing to reducing speckle contrast in a projected image.

In order to appreciate the contribution of the multiple-transverse-mode OPS laser to reducing speckle contrast it is useful to consider the following simple empirical explanation of how speckle contrast is reduced by divergent beams. If it were possible to observe monochromatic light incident on the screen in any one direction there would be observed a high speckle contrast. When light arrives on the screen in a range of directions there can be high speckle contrast in any one direction, but, as interference patterns causing the speckle effect are not in phase, these patterns average each other out to a point where, if there are enough patterns involved in the averaging, there will be no perceived speckle effects.

Now considering the divergence of the laser beam, any one bundle of rays incident on condenser lens 80 will not be a collimated bundle of rays but will be divergent to an extent dependent, inter alia, on the number of transverse modes in which the multiple-transverse-mode laser is operating. The additional divergence of the laser beam adds to the number of directions from which light is incident on the screen and augments the speckle-contrast reduction provided by the scanning arrangement. Clearly, of course, as the laser beam divergence is increased, there can be reached a divergence at which power in the beam falls to inadequate levels, or the beam becomes of sufficiently poor quality (sufficiently high $M^2$) that it can not be adequately focused by the projection optics. As discussed above, however, with reference to FIG. 3 and FIG. 4, a multiple-transverse-mode OPS-laser in accordance with the present invention can be operated at an $M^2$ of as high as about 6.0 without undue asymmetry or reduction of power and at even higher $M^2$ if asymmetry is not a problem. At an $M^2$ of 6.0, the beam would still have more than sufficient quality to be adequately focused, consistent with even the demands of high definition television (HDTV).

Figure 7:
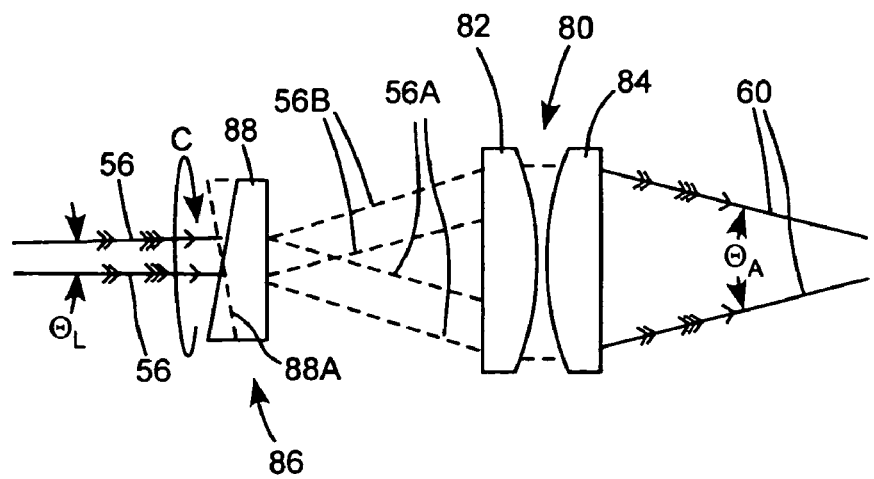
FIG. 7 is an elevation view, schematically illustrating one alternative scanning arrangement for providing an apparently high divergence in a combined laser beam delivered to a video system in accordance with the present invention, the arrangement including a rotating wedge-shaped optical element.

It should be noted here that scanning arrangement 74 of FIG. 6 is not the only scanning arrangement that can be used to accomplish apparent increased beam divergence in a display in accordance with the present invention. FIG. 7 schematically illustrates a considerably simpler arrangement 86, including a wedge or prism-shaped element 88 that is rotatable about an axis (not shown) perpendicular to one face thereof, as indicated by arrow C. In this drawing and in other drawings describing other scanning arrangements described hereinbelow only the scanning arrangement and the condenser lens receiving the scanned beam are shown for economy of illustration. Rotation of element 88 causes combined laser beams 56 to be scanned into an annular path on lens 80, into a hollow cone in effect, as indicated by dotted beams 56A and 56B. This arrangement requires that prism element is rotated at a much higher rate than faceted wheels 76 and 78 of scanning arrangement 74 of FIG. 6. Rotation of the element is further complicated inasmuch as it must be effected by an edge driven holder (not shown) of the element. Further, as the scanned beam describes only an annulus at the condenser lens and does not fill the cone, the angle of which is bounded by beams 56A and 56B. This results in a lesser reduction of the coherence radius than would be the case if the scanned beam, averaged over time, filled the entire cone as is the case in scanning arrangement 74.

Figure 8:
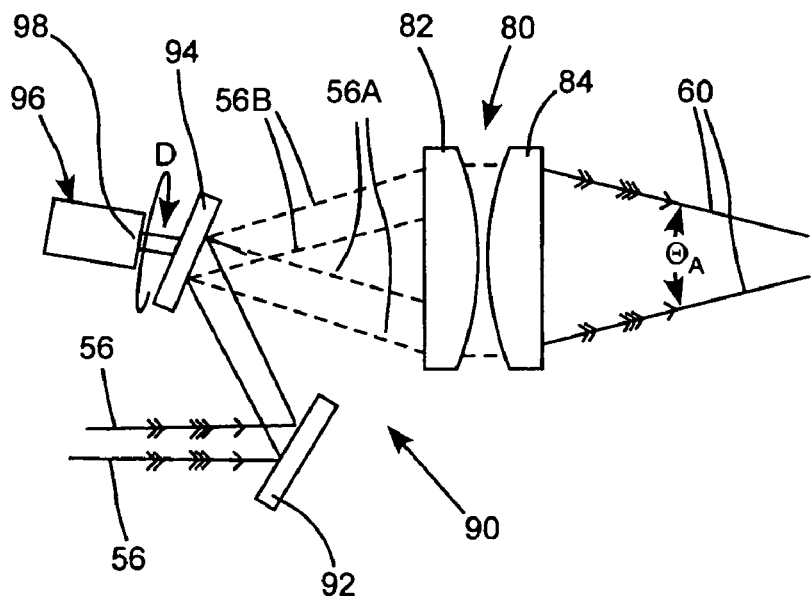
FIG. 8 is an elevation view, schematically illustrating another alternative scanning arrangement for providing an apparently high divergence in a combined laser beam delivered to a video system in accordance with the present invention, the arrangement including a stationary mirror, and a rotating mirror tilted on the rotation axis thereof.

One shortcoming of scanning arrangement 86 is remedied in another scanning arrangement 90 depicted in FIG. 8. Here, combined laser beams 56 are incident on a stationary tilted plane mirror 92. Mirror 92 directs the combined beams onto another plane mirror 94 that is mounted on a drive shaft 96 of a drive motor 98, with the plane of the mirror at an angle to a perpendicular to the drive shaft. Rotation of mirror 94 as indicated by arrow D causes combined laser beams 56 incident thereon to be scanned into an annular path or cone as indicated by dotted beams 56A and 56B. This arrangement does not remedy the absence of cone-filling or the rotation speed shortcomings of scanning arrangement 74.

Figure 9:
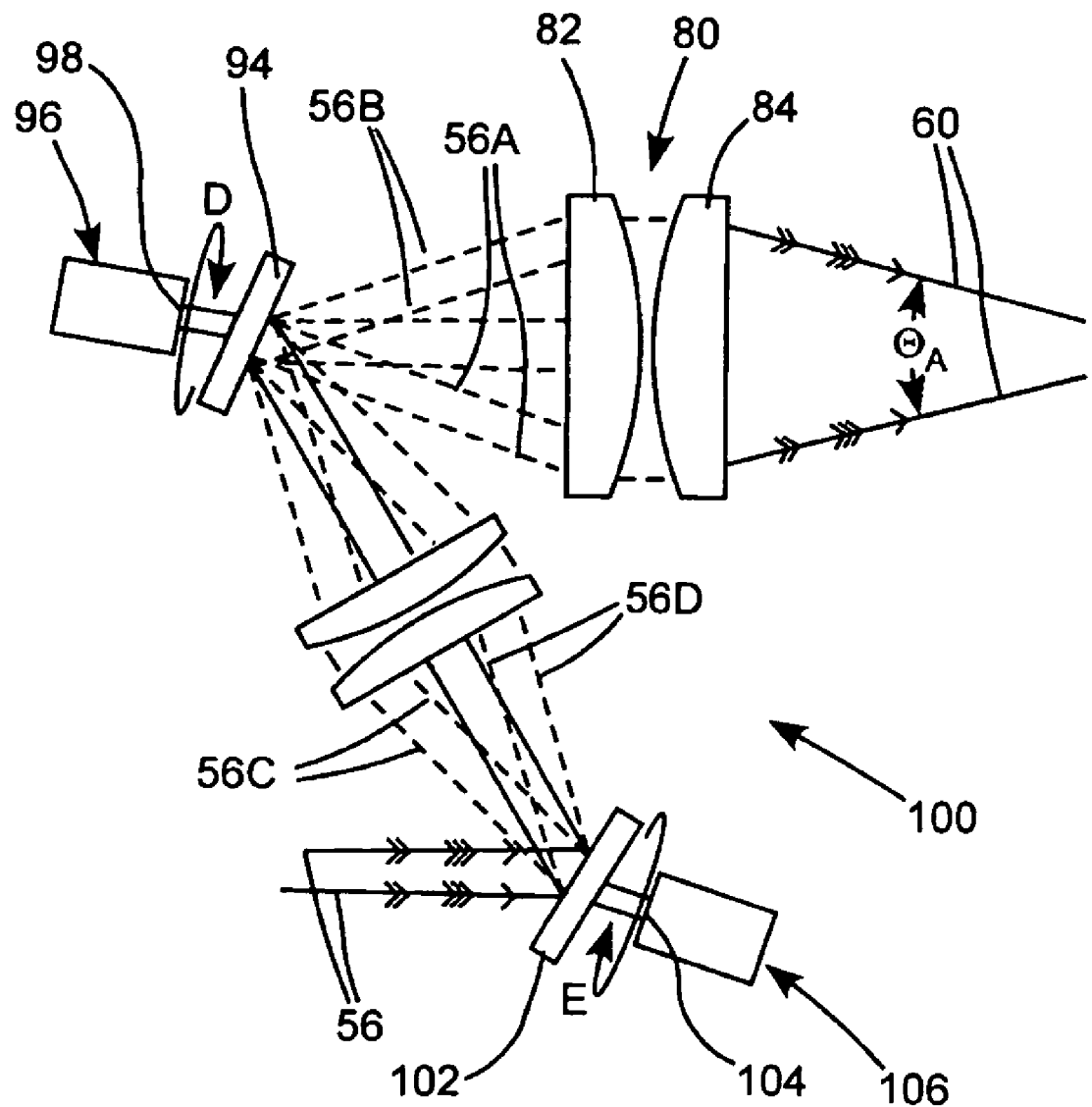
FIG. 9 is an elevation view, schematically illustrating yet another alternative scanning arrangement for providing an apparently high divergence in a combined laser beam delivered to a video system in accordance with the present invention, the arrangement including two rotating mirrors each thereof tilted on the rotation axis thereof.

FIG. 9, schematically illustrates yet another scanning arrangement 100. Scanning arrangement 100 is similar to scanning arrangement 90 with an exception that stationary mirror 92 of that scanning arrangement is replaced by a mirror 102 mounted on a drive shaft 104 of a drive motor 106, with the plane of mirror 102 at an angle to a perpendicular to the drive shaft. A condenser lens 71, including plano-convex lens elements 5 and 77, is located between the rotating mirrors and serves to refocus beam scans from mirror 102 back to a single spot on mirror 94. Rotating mirror 102 as indicated by arrow E, while rotating mirror 94 as indicated by arrow D, scans an annular pattern created by the mirror 102 into another annular pattern. If the mirrors are rotated at different rates this causes beams in combine beam 56 to be scanned in overlapping spiral patterns on condenser lens 80. This effectively, averaged over time, fills the cone bounded by the scan angle.

Figure 10:
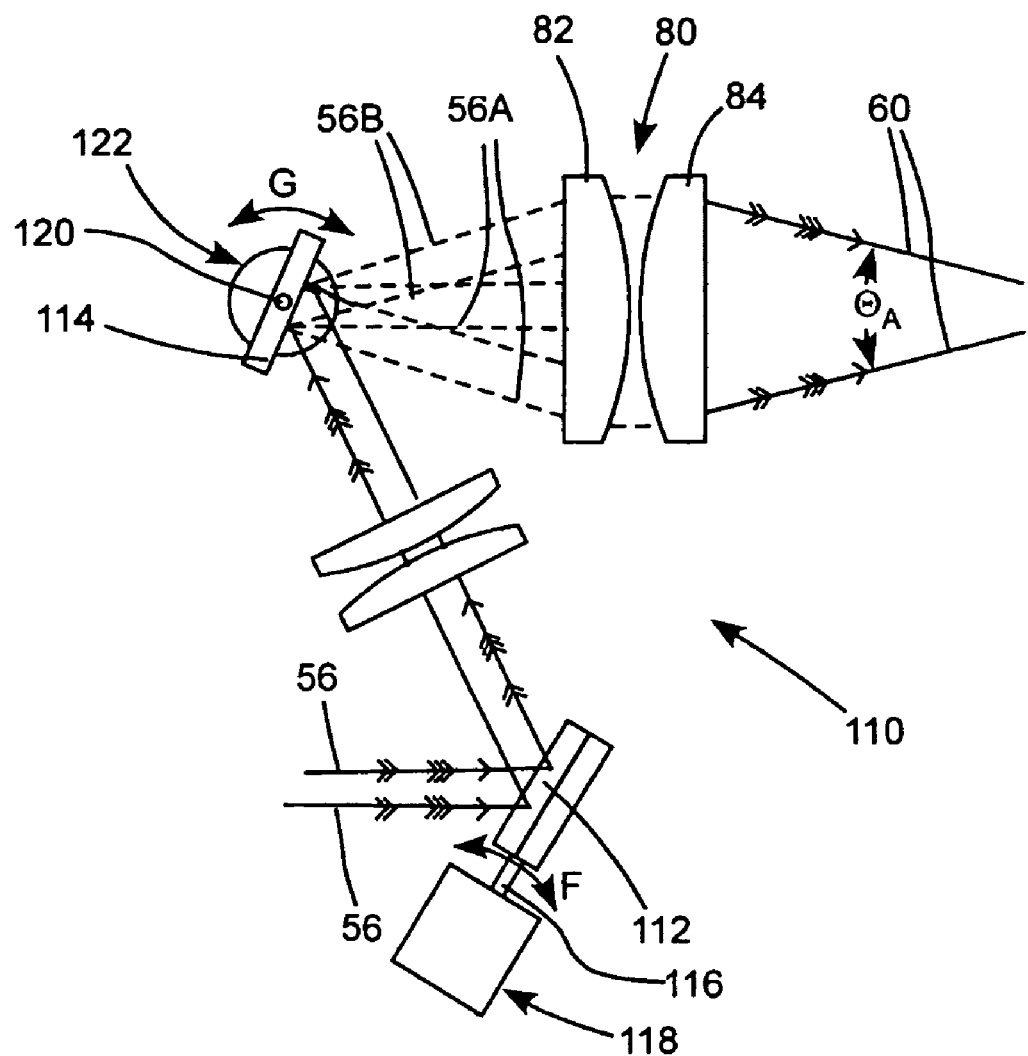
FIG. 10 is an elevation view, schematically illustrating still another alternative scanning arrangement for providing an apparently high divergence in a combined laser beam delivered to a video system in accordance with the present invention, the arrangement including a pair of galvanometer mirrors arranged to scan an incident combined laser beam in two mutually perpendicular axes.

FIG. 10 schematically illustrates still another alternative scanning arrangement 110 for simulating increased angular divergence of combined laser beams 56. Scanning arrangement 110 includes galvanometer scan mirrors 112 and 114. Scan mirror 112 is mounted on a drive shaft 116 of a motor a motor 118. Mirror 112 is scanned in reciprocal rotation about an axis (not explicitly shown) in the plane of the drawing as indicated by double arrows F. Scan mirror 114 is mounted on a drive shaft 120 of a motor a motor 122. Minor 114 is scanned in reciprocal rotation about an axis (not explicitly shown) perpendicular to the plane of the drawing, i.e., perpendicular to the scanning axis of mirror 112, as indicated by double arrows G. A condenser lens 71, including plano-convex lens elements 75 and 77, is located between the galvanometer scan mirrors and serves to refocus beam scans from mirror 112 back to a single spot on mirror 114. This arrangement allows a raster-type scan similar to the raster scan of scanning arrangement 74 of FIG. 6. Preferably, mirror 114 is scanned at the frame rate of the display, while mirror 112 is scanned at the line rate of the display.

Figure 11:
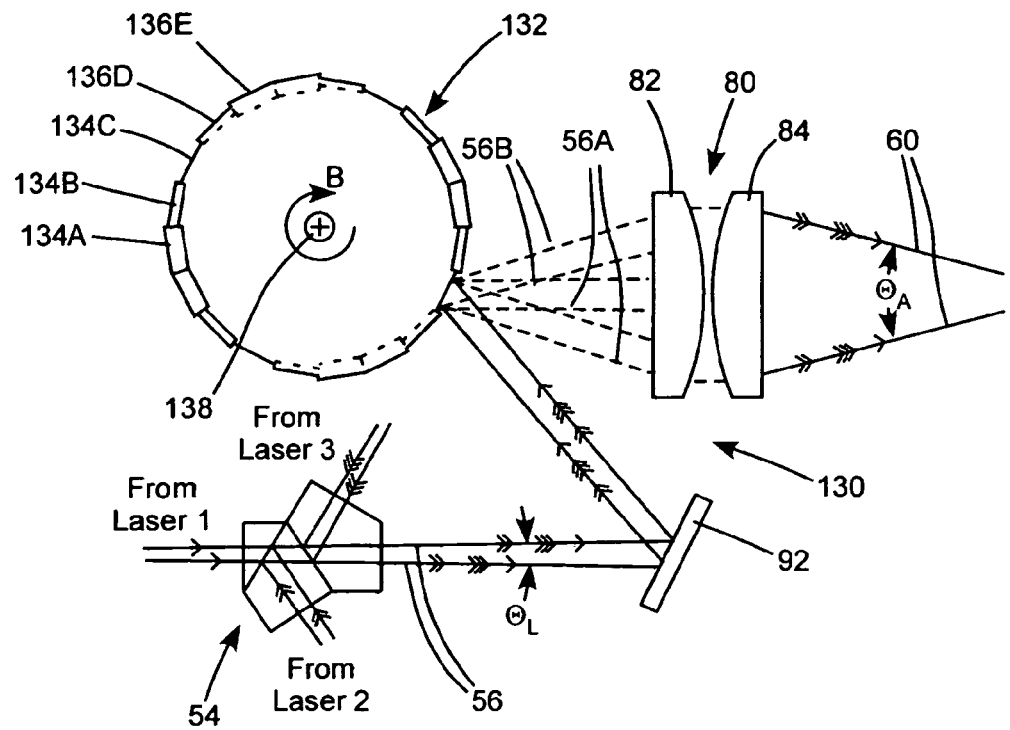
FIG. 11 is an elevation view, schematically illustrating a further alternative scanning arrangement for providing an apparently high divergence in a combined laser beam delivered to a video system in accordance with the present invention, the arrangement including a single, rotatable, faceted, scanner wheel having facets thereof progressively tilted with respect to the rotation axis of the wheel and arranged to scan an incident combined laser beam in two mutually perpendicular axes.
Figure 11A:
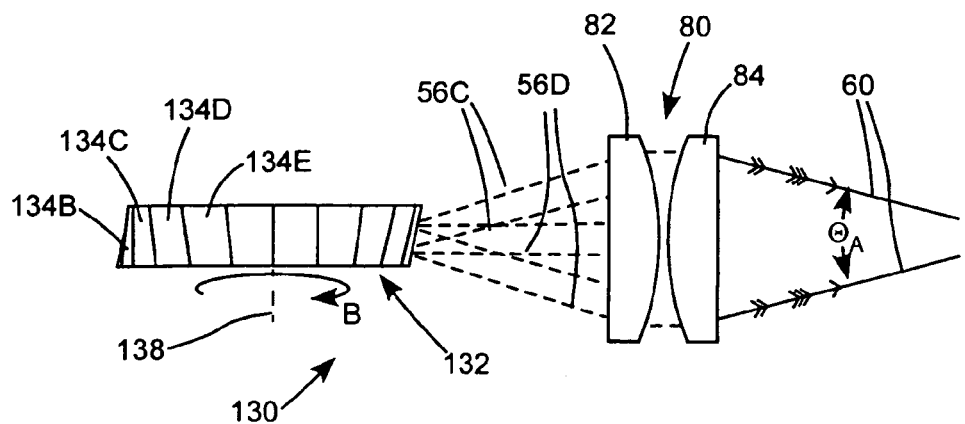
FIG. 11A is a plan view from above, schematically illustrating further details of the scanning wheel and tilted facets thereof in the scanning arrangement of FIG. 11.

FIG. 11 and FIG. 11A schematically illustrate a further alternative scanning arrangement 130 for simulating increased angular divergence of combined laser beams 56. This arrangement is similar to arrangement 74 of FIGS. 6 and 6A, with exceptions that faceted scanning wheel 76 is replaced by a plane mirror 92; condenser 71 of arrangement 74 is omitted; and scanning wheel 87 of arrangement 74 is replaced in arrangement 130 by a different faceted scanning wheel 132.

Scanning wheel 132, in this example, has 20 facets in total. This provides that there is an angle of 18° between each facet in the plane of FIG. 11. Facets are arranged in four sequential groups of five designated 134A, 134B, 134C, 134D, and 134E in peripheral sequence. Within group 134A-E, facet 134C is parallel to rotation axis 138 of wheel 132, the rotation axis here being perpendicular to the plane of FIG. 11. Facets 134B and 134D are tilted by +4° and −4.5° respectively to rotation axis 138. Facets 134A and 134E are tilted by +9° and −9° respectively to rotation axis 138. With the facets thus configured, the maximum angle between the facets within the group with respect to the rotation axis is 180. This is equal to the angle between adjacent facets in the rotation plane. Because of this, a beam 56, after reflection from wheel 132 during a revolution thereof, forms an approximately square pattern or raster consisting of five lines with angular span of +/−18 degrees both parallel to the plane of FIG. 11 (beams 56A and 56B) and perpendicular to the plane of FIG. 11 (as depicted in FIG. 11A by beams 56C and 56D). In terms of the number of components, scanning arrangement 130 is much simpler than the two-wheel arrangement of FIGS. 6 and 6A, and synchronization of the scan-raster with the display-raster is simpler as only one motor rotation need be precisely controlled. Wheel 132, however, is somewhat more difficult to manufacture than a faceted scanning wheel in which all facets are parallel to the rotation axis of the wheel.

It should be noted that the above-discussed scanning arrangements are not meant to constitute an exhaustive collection of such arrangements. Those skilled in the art, from the descriptions presented above may devise other such scanning arrangements without departing from the spirit and scope of the present invention.

While the combination of a multiple-transverse-mode OPS-laser with a scanning arrangement to create an apparent increase in divergence angle of a beam therefrom is effective in eliminating readily perceivable speckle effects, and also diffraction related effects, in the inventive laser illuminated display, it is believed that further reduction in speckle contrast may be necessary to bring the speckle contrast to a sufficiently low level to satisfy knowledgeable practitioners of the high-quality video display art. In order to achieve such a further reduction effort has been applied to devising screen configurations that can contribute to reduction of speckle effects.

Figure 12:
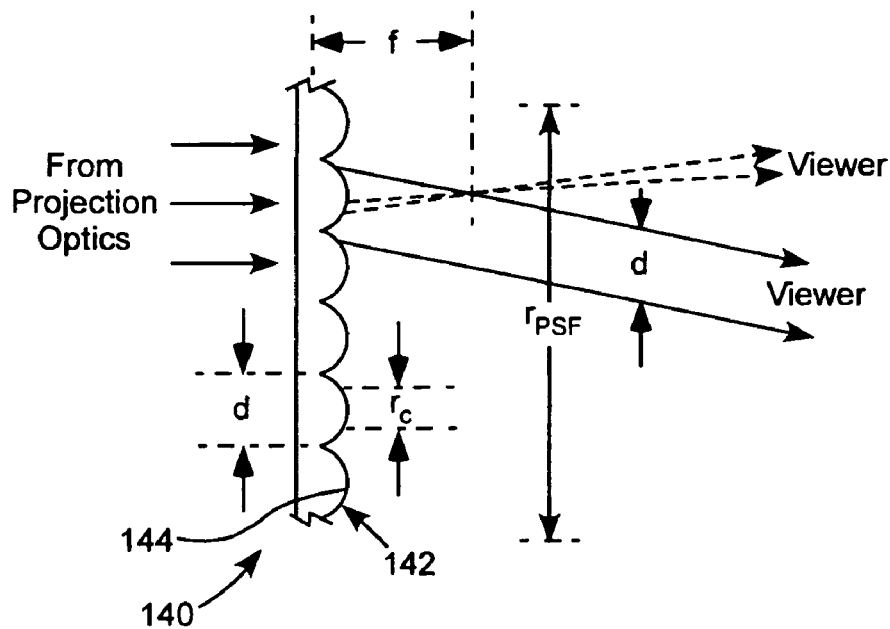
FIG. 12 is a cross-section view schematically illustrating one example of a projection screen for a display in accordance with the present invention, the screen including an array of contiguous spherical surfaces.
Figure 12A:
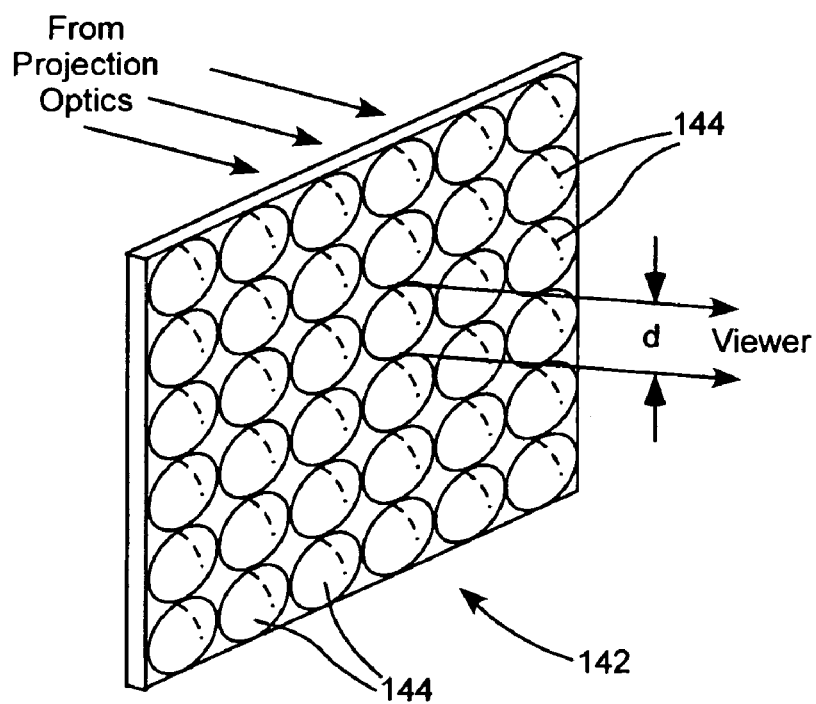
FIG. 12A is a three-dimensional view schematically illustrating further details of the screen of FIG. 12.

Two configurations are described below. One of the configurations is a screen comprising at least one plurality of microlenses or raised surface features in general. The other configuration is a screen in the form of a flat cell containing particles in suspension that are constantly agitated by a radio-frequency (RF) transducer or the like when an image is being projected on the screen. It is emphasized here, however, that each of these configurations is intended to be used in combination with either or both of the above-described inventive multiple-transverse-mode OPS-laser, or an above-described scanning arrangement, each of which provide a reduced coherence radius $r_c$ at the screen. Any of the below-described screens can be substituted for screen 68 in above-described embodiments of the inventive display FIG. 12 is a cross-section view (with traditional cross-hatching omitted for clarity) schematically illustrating important dimensions of a hypothetical screen fragment 140 comprising a plurality of features (for example spherical microlenses) 142 each having a convex surface 144. Here, features are arranged in a regular array thereof with surfaces point-contiguous (see FIG. 12A). Coherence radius reduction resulting from real or apparent increases in divergence of light illuminating the inventive display provides that the spatial coherence radius $r_c$ of the light incident on the screen is small compared to the spot size at the screen resolvable by a viewer. This spot size is usually referred to as the point spread function (PSF) of the human eye and is dependent on the eye-pupil (hereinafter simply pupil) and the distance of the viewer from the screen. By way of example, coherence radius at the screen can be reduced to 40 μm as discussed above. The PSF radius $r_{PSF}$ for light of a wavelength λ, for a viewer with a pupil size D of about 3.0 mm, at a distance of L=3 meters, can be defined by an equation:

$$r_{PSF}=\lambda*L/D=0.5 \text{ mm} \quad (1)$$

In screen 140 convex features 142 have a controlled convex shape. Each convex surface or lens 144 has a width dimension d that satisfies the inequality:

$$r_c<d<r_{PSF} \quad (2)$$

I.e., the size of the lens is greater than the coherence radius but less than the radius of the point spread function of the viewer's eye. Each lens has a focal length f. Light rays from the projection optics reaching screen 40 in any one direction are redirected by one or more features 142 in a plurality of directions, as indicated in FIG. 12 by solid and dashed lines, to one or more viewers. The redirected rays originating from a particular area of the screen of the size of the smaller of $r_c$ or $r_{PSF}$ add together on the amplitude basis in an image plane, i.e., a viewer's retina. Were the screen a rough screen, phases of these rays would vary unpredictably, thus creating random intensity variations from spot to spot, i.e., speckle. However, in inventive screen 140 the rays that reach a viewer are formed by the well-defined optical surfaces 144, and the smallest distance separating any pair of rays propagating from an area of size $r_{PSF}$ at the screen to the viewer, is equal to the period d of the array of features (lenses) 142. Because of this, if d is greater than the coherence radius $r_c$, all of these rays are un-correlated, and accordingly are added at the image plane on an intensity basis, in which case no speckle occurs. Since the size d of features 142 is less than the resolvable spot size $r_{PSF}$, a viewer cannot detect the presence of discrete features. Additionally, averaging of multiple rays originating from the resolvable spot of the size $r_{PSF}$ helps to improve perceived uniformity of the screen.

Preferably, the ratio of the focal length f of the features (lenses) in the array to the lens size d is kept relatively low, in order to increase viewing angle of the screen. For example, ratios of about 0.5 are practically achievable. This corresponds to a full viewing angle of 90°. While a lesser viewing angle may be considered less desirable from the point of view of accommodating several viewers, an advantage of a reduced viewing angle is an increased gain of the screen, which allows a higher perceived image brightness.

Figure 13:
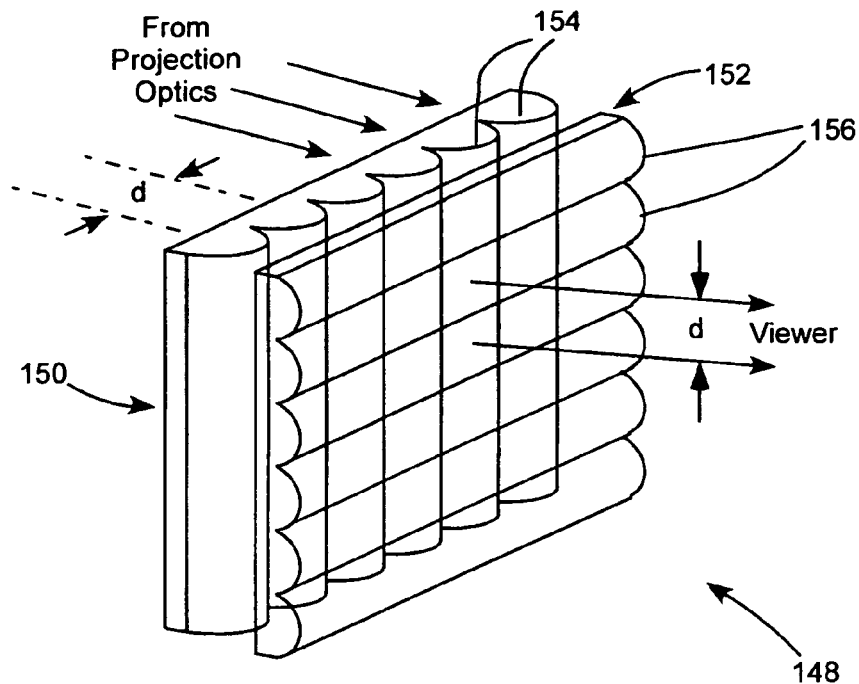
FIG. 13 is a three-dimensional view schematically illustrating another example of a projection screen for a display in accordance with the present invention, the screen including two spaced-apart sheets, each thereof including an array of cylindrical microlenses and arranged such that the microlenses in one array are oriented perpendicular to the microlenses in the other array.
Figure 14:
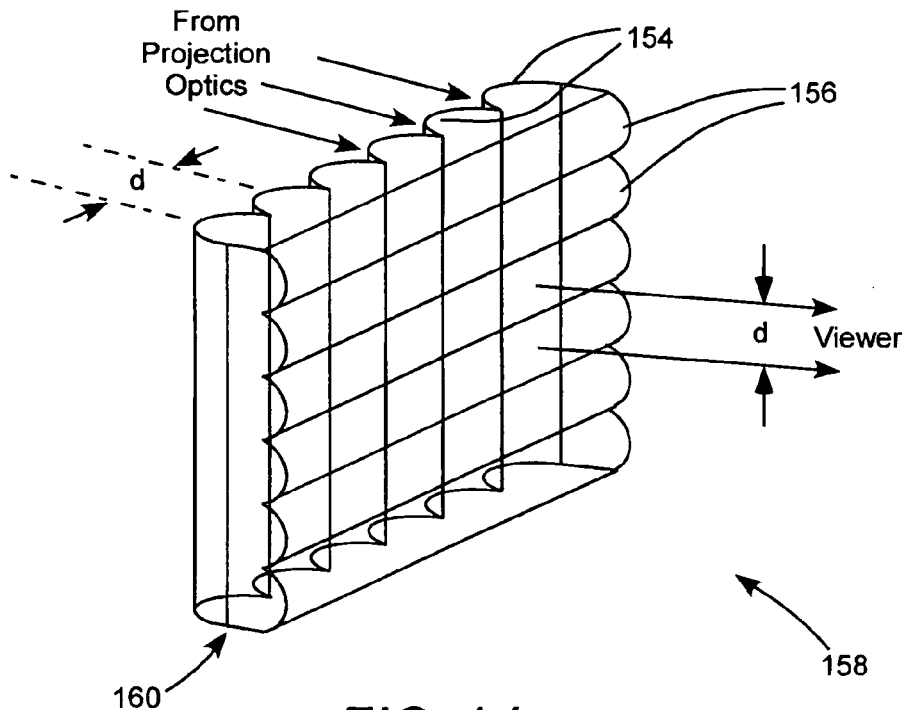
FIG. 14 is a three-dimensional view schematically illustrating yet another example of a projection screen for a display in accordance with the present invention similar to the screen of FIG. 13 but wherein the two arrays of cylindrical microlenses are formed on opposite sides of a single sheet.

FIG. 13 schematically illustrates one practical arrangement 148 for realizing a screen as described above with reference to FIG. 12. Screen 148 comprises two regular arrays 150 and 152 of cylindrical microlenses. Only small fragments of what would be the practical extent of such arrays are depicted for convenience of illustration. Cylindrical microlenses 154 in array 148 are contiguous and have a spacing d as specified above. Cylindrical microlenses 156 in array 152 are contiguous and also have a spacing d, as specified above. Arrays 150 and 152 are arranged with cylindrical microlenses in one thereof perpendicular to the cylindrical microlenses in the other. This provides an optical effect similar to that which would be provided by a regular array of spherical microlenses having a diameter d and focal length f, and being contiguously packed in the array. Referring to FIG. 14, a similar optical effect can be obtained in a screen 158 wherein the perpendicularly oriented arrays of cylindrical microlenses 154 and 156 are impressed on opposite sides of a single sheet 160.

Figure 15:
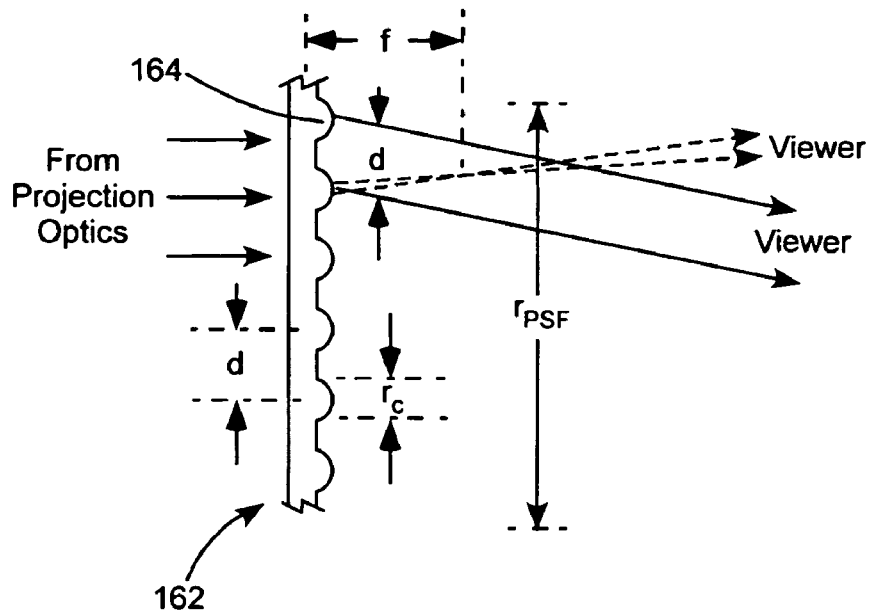
FIG. 15 is a cross-section view schematically illustrating yet another example of a projection screen for a display in accordance with the present invention, the screen including an array of spherical microlenses.
Figure 16:
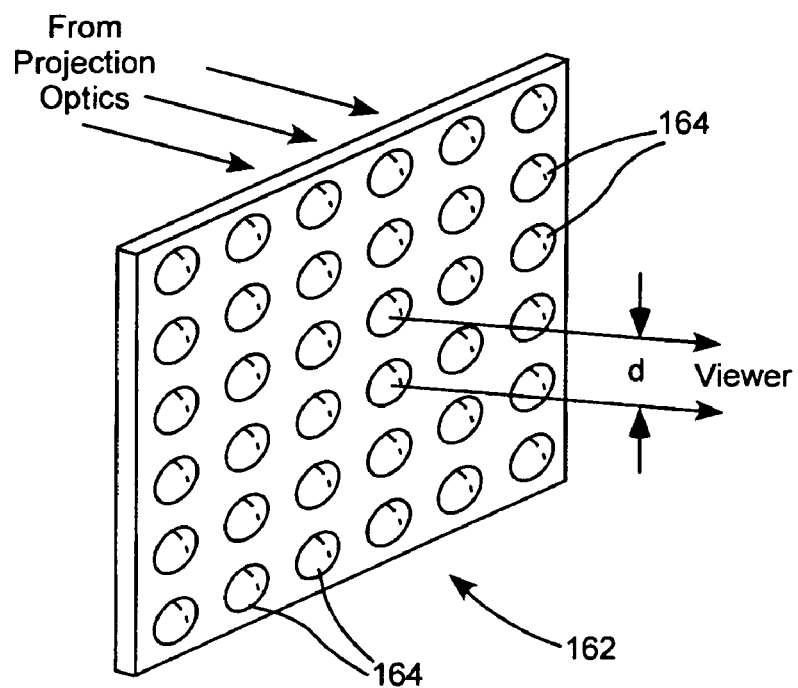
FIG. 16 is a three-dimensional view schematically illustrating further details of the projection screen of FIG. 15.

FIG. 15 is a cross-section view (again with traditional cross-hatching omitted for clarity) schematically illustrating important dimensions of a hypothetical screen fragment 162 comprising an array of convex spherical microlenses 164, spaced apart by a distance d and having a focal length f, as specified above. FIG. 16 is a three-dimensional view schematically illustrating screen fragment 162 including a two-dimensional array of the convex spherical microlenses.

Arrays of spherical and cylindrical microlenses having feature dimensions described above can be made by molding or printing the arrays into transparent plastic sheets. Similar arrays are used in industry as diffractive optical elements for information technology, industry automation and biomedical applications. Such arrays are commercially available, for example, from Edmund Industrial Optics of Barrington, N.J., and Leister Technologies LLC of Itasca, Ill.

Figure 17:
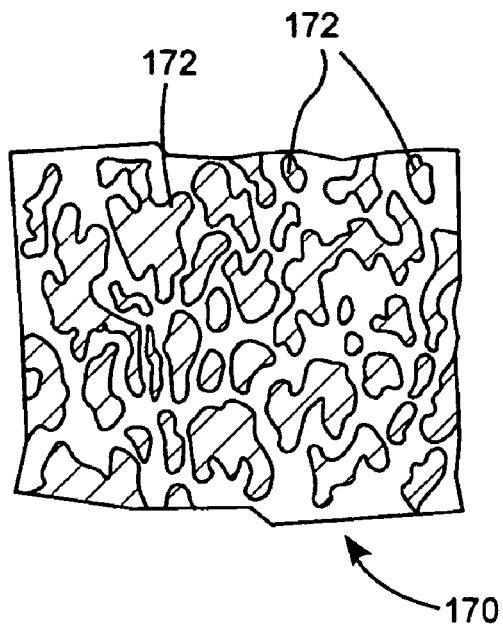
FIG. 17 schematically illustrates a fragment of a screen having an uneven distribution of uneven smooth surface features.
Figure 18:
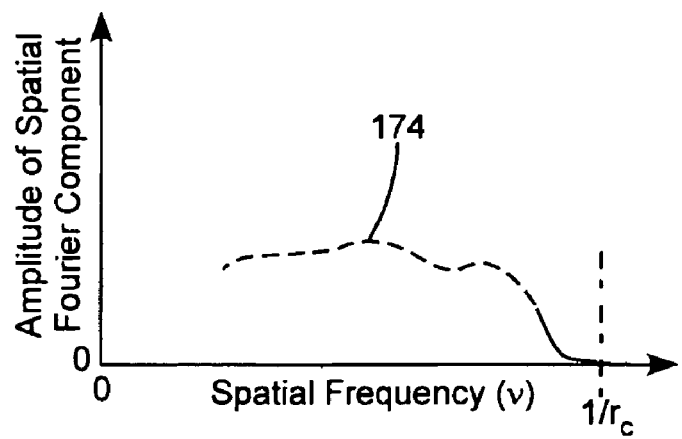
FIG. 18 is a graph schematically illustrating spatial Fourier component amplitude as a function of feature spatial frequency for a generalized distribution of surface features similar to the distribution of FIG. 17.

It is not necessary that features of a screen in accordance with the present invention be regular as discussed above. By way of example, FIG. 17 schematically depicts a surface fragment of a screen 170 having unevenly distributed smooth features 172 of uneven circumferential shape and height. Such a surface can be computer-generated, in a manner similar to that in which prior-art holographic diffusers for shaping laser-beams into various forms are generated. Such a diffuser can be designed to produce a nearly uniform angular distribution of light from a beam incident thereon, thereby providing a large viewing angle for the screen. Any algorithm used to computer generate a suitable distribution of surface features for that purpose must be constrained to restrict the spectrum of spatial frequencies ν of the feature shape or phase profile. Specifically, it is necessary that the amplitudes of Fourier components A(ν) of the spatial frequency spectrum are non-zero only in a spatial frequency range below $r_c^{-1}$, where $r_c^{-1}$ is the inverse of the coherence radius $r_c$. This condition can be mathematically specified by the following equations:

$$|A(v)| \geq 0 \text{ if } v < (r_c)^{-1} \qquad (3)$$

$$|A(v)| = 0 \text{ if } v \geq (r_c)^{-1}. \qquad (4)$$

and is schematically graphically depicted shown in FIG. 18, wherein curve 174 can have any shape required to provide a desired angular distribution, provided equations (3) and (4) are satisfied. These equations mean in effect that the smallest feature size of the screen is greater than the coherence radius $r_c$, and the discussion presented above for regular microlens arrays is applicable i.e., the inequality of equation (2) must be satisfied. A description of design algorithms for such surfaces is not necessary for understanding principles of the present invention and, accordingly, is not presented herein. Surfaces of this kind can commercially designed and generated on a variety of transparent materials including plastics and fused silica, for example by MEMS Optical Inc. of Huntsville, Ala.

Figure 19:
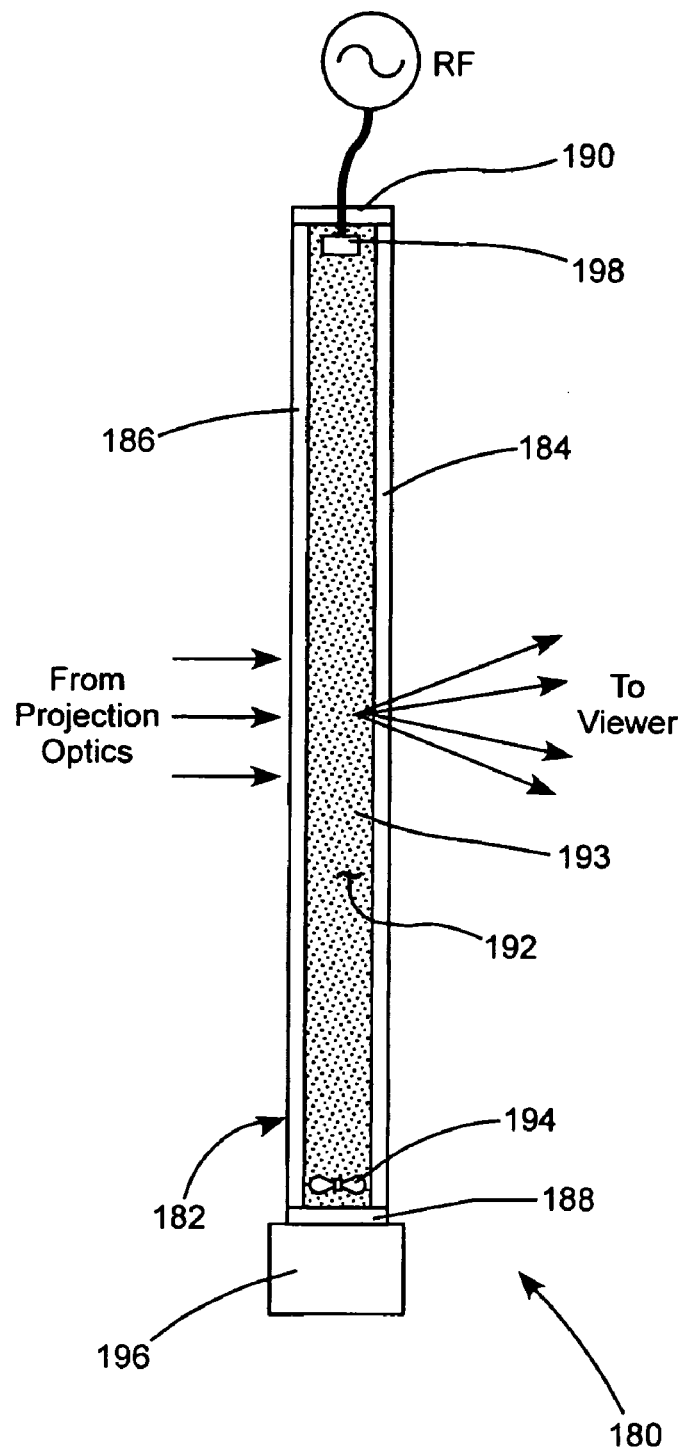
FIG. 19 is an elevation view schematically illustrating one preferred example of a screen including a cell containing a fluid having particles suspended therein, and a piezo-electric transducer and one of a plurality of magnetically driven stirrers for keeping the particles in random motion.
Figure 19A:
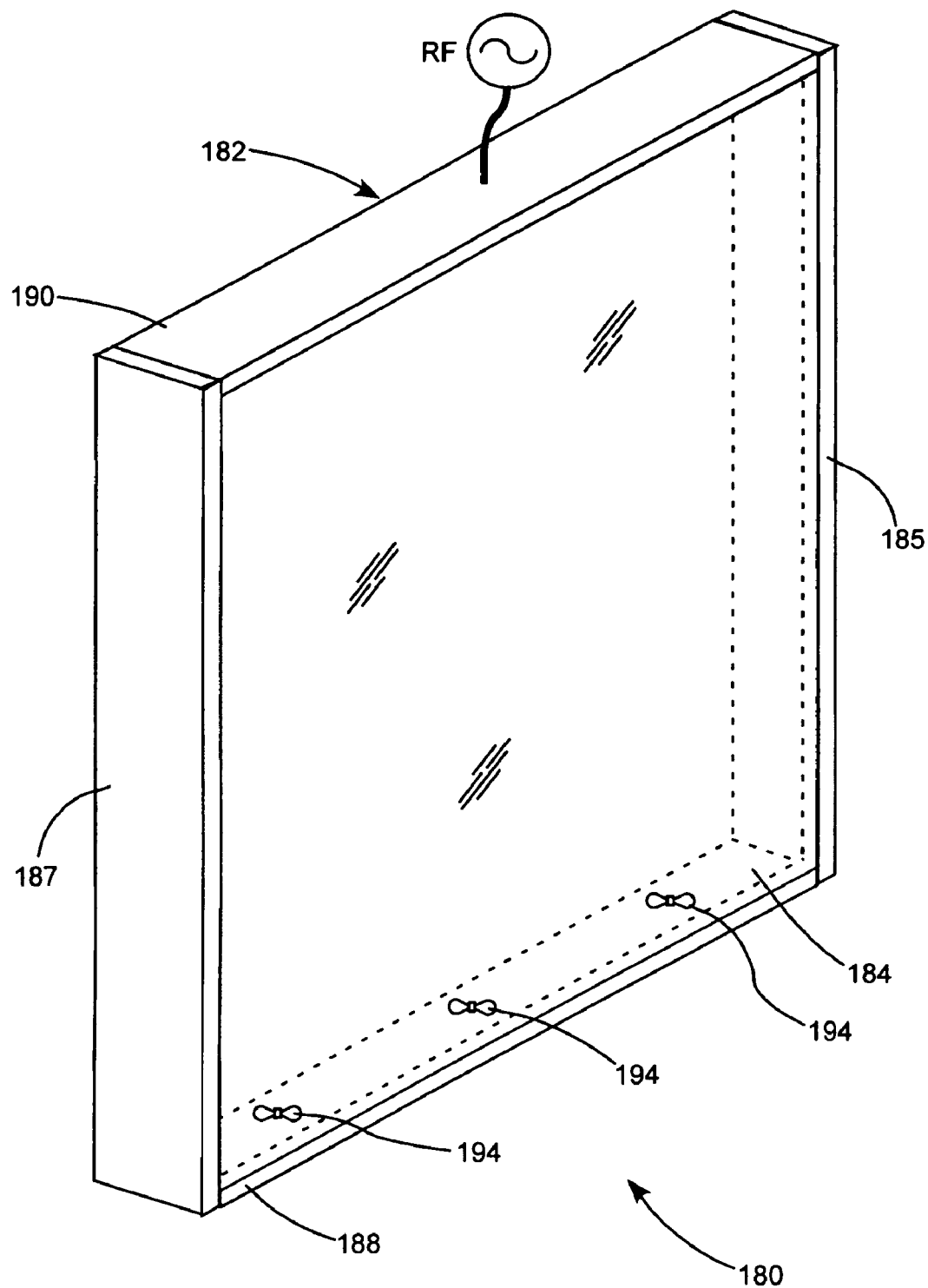
FIG. 19A is a three-dimensional view schematically further detail of the magnetically driven stirrers in the screen of FIG. 19.

Continuing now with a description of an alternate screen configuration, FIG. 19 and FIG. 19A schematically illustrate one embodiment of a screen 180 in the form of a flat cell 182 containing a transparent liquid (fluid) 192 having particles 193 in suspension therein. Cell 182 has front and rear (from a viewer's perspective) transparent panels 184 and 186, a base cap strip 188, a top cap strip 190, and side panels 185 and 187 (see FIG. 19A). A plurality of stirring blades 194 disposed along the periphery of the display agitate the suspended particles when an image is being projected on the screen. This maintains the particles in rapid random motion with respect to each other. Each stirring blades 194 is driven by magnetic drive unit 196 (see FIG. 19). Such stirrers are commercially available, for example from Edmund Scientific Inc. of Barrington, N.J. Such stirrers may be driven at rotation rates up to 2500 revolutions per minute. The random motion (or vibration) of the particles reduces speckle effects. At any infinitesimal instant in time there would be a speckle effect, for reasons discussed above with reference to a speckle produced by a rough surface. Because of the random motion of particles, however, many speckle patterns are time averaged due to the slow response time of the human eye. This reduces the speckle contrast.

The particles can be, for example, particles of any commonly available oxide material, such as silicon dioxide, aluminum oxide, or titanium oxide. The fluid can be water, or some organic fluid of relatively low viscosity. Whatever fluid is selected it should preferably be chemically inert, non-toxic, and should also preferably have a low evaporation rate and low cost.

The particles must be small enough to scatter light, for example, preferably have a dimension less than about 10.0 μm at which dimension the particles should not readily settle. If the particles are sufficiently small, for example, have a dimension less than about 1 μm, the particles may move randomly with respect to each other through Brownian motion. In order to discourage particles from settling when not being agitated, it may be found convenient to provide one or more RF driven transducers 198. Such transducers can be operated to prevent particles from coagulating or settling, whatever the particle size.

It should be noted here that while a random-particle-motion screen is effective in itself, it may be used together with microlens effects as described above. By way of example microlenses or similar features may be formed on one or both of front and rear panels 186.

The present invention is described above in terms of a preferred and other embodiments. The invention is not limited, however, to the embodiments described and depicted. Rather, the invention is limited only by the claims appended hereto.

What is claimed is:

1. A projection display, comprising:
   at least one optically pumped semiconductor (OPS) laser, said laser including a semiconductor gain medium located with a resonator including one mirror spaced from the gain medium, said gain medium being optically pumped in order to generate fundamental radiation and wherein the resonator is configured so that the fundamental (TEM$_{00}$) mode size at the gain medium is smaller than the pump beam spot size at the gain medium whereby the laser generates laser radiation in multiple transverse modes in both orthogonal (X/Y) axes perpendicular to the propagation axis of the delivered laser radiation, said laser further including a nonlinear crystal within the resonator for doubling the frequency of the fundamental radiation;
   a spatial light modulator for spatially modulating said radiation from said OPS-laser in accordance with a component of an image to be displayed; and
   projection optics for projecting said spatially modulated light onto a screen on which said image is to be displayed.

2. The display of claim 1, wherein said OPS-laser delivers one of green or blue radiation.

3. The display of claim 1, wherein said OPS-laser delivers said radiation in a beam having an $M^2$ between about 2 and 20.

4. The display of claim 1, wherein said spatial light modulator is one of a group of spatial light modulators consisting of a grating light-valve modulator, a digital light processor, a grating electromechanical system, or a liquid crystal on silicon modulator.

5. The display of claim 4, wherein said spatial light modulator is a digital light processor.

6. The display of claim 1, further including two additional lasers, wherein each of the three lasers generates a radiation beam having a different wavelength, said display further including a time modulation arrangement for periodically interrupting delivery of radiations beams of the lasers to said spatial light modulator in a manner such that said radiation beams are received and spatially modulated separately by said spatial light modulator.

7. The display of claim 6, wherein said time modulation arrangement includes periodically interrupting the optical pumping of said optically pumped semiconductor laser, thereby periodically interrupting generation of said radiation beam provided thereby.

8. The display of claim 7, wherein said optically pumped semiconductor laser is pumped by light from a diode-laser array, and said periodic interruption of said optical pumping is effected by periodically turning said diode-laser array on and off.

9. The display of claim 1, further including:
two additional lasers, wherein each of the lasers generates a radiation beam having a different wavelength each of said beams having an original beam divergence;
an optical arrangement for directing said beams along a common path;
a first lens;
a scanning arrangement for scanning said beams in said common path in a particular pattern over said first lens, such that averaged over time each of said beams has an apparent beam divergence greater than said original divergence thereof, said first lens being arranged to direct said scanned beams into a beam homogenizer and thereafter to the spatial light modulator; and
projection optics for projecting said homogenized, spatially modulated, beams onto a screen on which said image is to be displayed.

10. The display of claim 9, wherein said scanning arrangement includes a rotatable prism disposed in said common beam path in a manner such that when said prism is rotated said beams are scanned in an annular pattern over said first lens.

11. The display of claim 9, wherein said screen includes a transparent sheet having a plurality of raised surfaces features for directing light in said beams incident thereon in a plurality of directions, each of said features having a dimension that is greater than the coherence radius of said light on said screen but is not resolvable by a viewer at normal viewing distance from said screen.

12. The display of claim 9, wherein said screen includes a transparent cell containing a liquid having a plurality of particles in suspension therein said particles being sufficiently small to scatter light from said red, green and blue beams and being in continuous random motion with respect to each other while said image is being displayed.

13. A projection display, comprising:
a spatial light modulator;
first, second, and third lasers for generating and delivering respectively a red light beam, a green light beam and a blue light beam, at least one of said first, second, and third lasers being an intracavity frequency doubled optically pumped semiconductor laser;
an optical arrangement for delivering said red, green and blue light beams to said spatial light modulator, said spatial light modulator being arranged to amplitude modulate said red, green and blue light beams in accordance with red, green, and blue components of an image to be displayed;
a time modulation arrangement for periodically interrupting delivery of said red, green, and blue light beams to said spatial light modulator in a manner such that said light beams are received and spatially modulated separately by said spatial light modulator; and
wherein said time modulation arrangement includes periodically interrupting said optical pumping of said optically pumped semiconductor laser, thereby periodically interrupting generation of said light beam provided thereby.

14. The display of claim 13, wherein said optically pumped semiconductor laser is pumped by light from a diode-laser array, and said periodic interruption of said optical pumping is effected by periodically turning said diode-laser array on and off.

15. The display of claim 13, wherein said optically pumped semiconductor laser delivers said light beam in multiple transverse modes.

16. A projection display, comprising:
first, second, and third lasers for generating and delivering respectively a red light beam, a green light beam and a blue light beam, at least one of said first, second, and third lasers being an intracavity doubled optically pumped semiconductor laser, and each of said beams having an original beam divergence;
an optical arrangement for directing said red, blue, and green, beams along a common path;
a first lens;
a scanning arrangement for scanning said red, green and blue beams in said common path in a particular pattern over said first lens, such that averaged over time each of said beams has an apparent beam divergence greater than said original divergence thereof, said first lens being arranged to direct said scanned beams into a beam homogenizer;
a spatial light modulator, said spatial light modulator arranged to receive said red green and blue light beams homogenized by said beam homogenizer spatially modulate said homogenized beams in accordance with a red, green or blue portion of an image to be displayed; and
projection optics for projecting said homogenized, spatially modulated, red, green, and blue beams onto a screen on which said image is to be displayed.

17. The display of claim 16, wherein said scanning arrangement includes a rotatable prism disposed in said common beam path in a manner such that when said prism is rotated said beams are scanned in an annular pattern over said first lens.

18. The display of claim 16, wherein said scanning arrangement includes a fixed mirror disposed in said common beam path, and directing said common path onto a rotatable mirror arranged at an angle to a rotation axis thereof in a manner such that when said rotatable mirror is rotated said beams are scanned in an annular pattern over said first lens.

19. The display of claim 16, wherein said scanning arrangement includes first and second rotatable mirrors, each thereof inclined to a rotation axis thereof and having a second lens therebetween, said first rotatable mirror being disposed on said common path of said beams in a manner such that when said first mirror is rotated said red, green, and blue beams are scanned over said second lens in a first annular pattern, said second lens being arranged to focus said first annular pattern onto said second rotatable mirror, and said second rotatable mirror being arranged such that rotation thereof, while said first mirror is rotating causes said first annular pattern to be scanned over said first lens in a second annular pattern.

20. The display of claim 16, wherein said scanning arrangement includes first and second rotatable faceted scanning wheels having a second lens therebetween, said facets of said first rotatable scanning wheel being disposed on said common path of said beams in a manner such that when said first scanning wheel is rotated said red, green, and blue beams are scanned over said second lens in a first transverse axis, said second lens being arranged to focus said scanned beams onto facets of said second rotatable scanning wheel, and said second scanning wheel being arranged such that rotation thereof, while said first scanning wheel is rotating, causes said focused scanned beams be scanned over said first lens in a second axis perpendicular to said first axis, whereby said red, green blue beams are scanned in a raster pattern over said first lens.

21. The display of claim 16, wherein said scanning arrangement includes first and second reciprocally rotatable galvanometer mirrors having a second lens therebetween, said first galvanometer mirror being disposed on said common path of said beams in a manner such that when said first galvanometer mirror is rotated said red, green, and blue beams are scanned over said second lens in a first axis, said second lens being arranged to focus said scanned beams onto said second galvanometer mirror, and said second galvanometer mirror being arranged such that rotation thereof causes said focused scanned beams be scanned over said first lens in a second axis perpendicular to said first axis, whereby said red, green blue beams are scanned in a raster pattern over said first lens.

22. The display of claim 16, wherein said scanning arrangement includes a rotatable faceted scanning wheel rotatable about a rotation axis, facets of said scanning wheel being inclined at a plurality of different angles to said rotation axis thereof, and said scanning wheel being disposed on said common path of said beams in a manner such that when said scanning wheel is rotated said beams are scanned by said facets in mutually perpendicular axes in a raster pattern over said first lens.

* * * * *